United States Patent [19]
Rickard et al.

[11] Patent Number: 6,112,189
[45] Date of Patent: *Aug. 29, 2000

[54] METHOD AND APPARATUS FOR AUTOMATING NEGOTIATIONS BETWEEN PARTIES

[75] Inventors: John T. Rickard, Durango; William A. Lupien, Hesperus; George A. Wallace, Durango, all of Colo.

[73] Assignee: OptiMark Technologies, Inc., Jersey City, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/820,788

[22] Filed: Mar. 19, 1997

[51] Int. Cl.[7] .................................................. G06F 17/60
[52] U.S. Cl. .................................... 705/37; 705/36
[58] Field of Search ........................ 705/37, 35, 36; 707/1, 102; 709/200, 201, 204, 205, 206, 217, 218, 227, 228, 229

[56] References Cited

U.S. PATENT DOCUMENTS

| | | | |
|---|---|---|---|
| 3,573,747 | 4/1971 | Adams et al. | 705/37 |
| 3,581,072 | 5/1971 | Nymeyer | 705/37 |
| 4,334,270 | 6/1982 | Towers | 705/36 |
| 4,346,442 | 8/1982 | Musmanno . | |
| 4,376,978 | 3/1983 | Musmanno . | |
| 4,412,287 | 10/1983 | Braddock, III | 705/37 |
| 4,566,066 | 1/1986 | Towers . | |
| 4,597,046 | 6/1986 | Musmanno et al. . | |
| 4,642,768 | 2/1987 | Roberts . | |
| 4,674,044 | 6/1987 | Kalmus et al. | 705/37 |

(List continued on next page.)

FOREIGN PATENT DOCUMENTS

| | | |
|---|---|---|
| 2016715 | 5/1990 | Canada . |
| 90990169 | 5/1990 | European Pat. Off. . |
| 0 401 203 | 12/1990 | European Pat. Off. . |
| 0 411 748 A2 | 6/1991 | European Pat. Off. . |
| 0 434 224 A2 | 6/1991 | European Pat. Off. . |
| 0 512 702 A2 | 11/1992 | European Pat. Off. . |
| 3-68067 | 5/1990 | Japan . |
| 2 275 796 | 9/1994 | United Kingdom . |
| 2 277 389 | 10/1994 | United Kingdom . |
| WO 95/06918 | 3/1995 | WIPO . |
| WO 9605563 A1 | 2/1996 | WIPO . |
| WO 96/34357 | 10/1996 | WIPO . |

OTHER PUBLICATIONS

Kelly, Doug, "Broker's Software Advances Computerized Stock Trading", Financial Post, S. 1, p. 1, Aug. 14, 1992.

(List continued on next page.)

*Primary Examiner*—Emanuel Todd Voeltz
*Assistant Examiner*—Alexander Kalinowski
*Attorney, Agent, or Firm*—Neil G. Cohen; Cummings & Lockwood

[57] ABSTRACT

A system calculates the mutual satisfaction between negotiating parties and maximizes their mutual satisfaction over a range of decision variables and does so without requiring the parties to identify themselves and their positions to each other. For automatically negotiating agreements between multiple parties, a computer accepts a satisfaction function from an offering party who defines his degree of satisfaction to agree to a range of terms upon which the party is desirous of negotiating as a function of the relevant decision variables. The computer then accepts input from all other parties regarding their degree of satisfaction to agree to each of the terms as a function of a particular relevant decision variable. The computer then calculates a satisfaction function for each of these terms based on all of the individual inputs. Next, the computer calculates a joint satisfaction function for all of the terms as a function of the particular relevant decision variable, and then calculates the mutual satisfaction function for the offering party and the other parties, also as a function of the particular relevant decision variable. Finally, the computer calculates the set of decision variable yielding the maximum mutual satisfaction and provides this output to the parties.

62 Claims, 26 Drawing Sheets

U.S. PATENT DOCUMENTS

| | | | |
|---|---|---|---|
| 4,677,552 | 6/1987 | Sibley, Jr. | 705/37 |
| 4,677,933 | 7/1987 | Rotella . | |
| 4,694,397 | 9/1987 | Grant et al. | 705/42 |
| 4,722,055 | 1/1988 | Roberts . | |
| 4,751,640 | 6/1988 | Lucas et al. | 705/36 |
| 4,752,877 | 6/1988 | Roberts et al. | 705/35 |
| 4,774,663 | 9/1988 | Musmanno et al. . | |
| 4,799,156 | 1/1989 | Shavit et al. . | |
| 4,839,804 | 6/1989 | Roberts et al. . | |
| 4,876,648 | 10/1989 | Lloyd . | |
| 4,903,201 | 2/1990 | Wagner | 705/37 |
| 4,910,676 | 3/1990 | Alldredge . | |
| 4,933,842 | 6/1990 | Durbin et al. . | |
| 4,953,085 | 8/1990 | Atkins . | |
| 4,980,826 | 12/1990 | Wagner . | |
| 4,992,939 | 2/1991 | Tyler . | |
| 5,025,138 | 6/1991 | Cuervo | 705/38 |
| 5,077,665 | 12/1991 | Silverman et al. | 705/37 |
| 5,083,270 | 1/1992 | Gross et al. . | |
| 5,083,782 | 1/1992 | Nilssen . | |
| 5,101,353 | 3/1992 | Lupien et al. | 705/37 |
| 5,126,936 | 6/1992 | Champion et al. . | |
| 5,132,899 | 7/1992 | Fox . | |
| 5,136,501 | 8/1992 | Silverman et al. | 705/37 |
| 5,148,365 | 9/1992 | Dembo . | |
| 5,161,103 | 11/1992 | Kosaka et al. | 705/36 |
| 5,168,446 | 12/1992 | Wiseman | 705/37 |
| 5,195,031 | 3/1993 | Ordish | 705/37 |
| 5,214,579 | 5/1993 | Wolfberg et al. | 705/36 |
| 5,220,500 | 6/1993 | Baird et al. | 705/36 |
| 5,227,967 | 7/1993 | Bailey | 705/36 |
| 5,243,331 | 9/1993 | McCausland et al. . | |
| 5,283,731 | 2/1994 | Lalonde et al. | 705/37 |
| 5,375,055 | 12/1994 | Togher et al. | 705/37 |
| 5,500,793 | 3/1996 | Deming, Jr. et al. | 705/37 |
| 5,557,517 | 9/1996 | Daughterty, III | 364/408 |
| 5,655,088 | 8/1997 | Midorikawa et al. | 705/37 |
| 5,664,115 | 9/1997 | Fraser | 705/37 |
| 5,689,652 | 11/1997 | Lupien et al. | 705/37 |

OTHER PUBLICATIONS

McFarland, Margaret, Deputy Secretary, Division of Market Regulation, SEC Release No. 34–34469; File No. SR–CHX–93–19, "Self Regulatory Organizations, Notice of Amendment Nos. 1, 2, 3 and 4 to Proposed Rule Change by Chicago Stock Exchange, Inc. Relating to the Creation of the Chicago Match System" Federal Register vol. 59, No. 150, Aug. 1994.

Katz, Jonathan G., Secretary, Division of Market Regulation, SEC Release No. 34–33542; File No. SR–CHX–93–19, "Self–Regulatory Organizations; Proposed Rule change by Chicago Stock Exchange, Incorporated Proposing to Establish Rules for an Institutional Trading System, Called the Match Market Exchange Family" Federal Register vol. 59, No. 24, Jan. 1994.

Colby, Robert L.D., Deputy Director, Division of Market Regulation, Letter from Deputy Director to the Chicago Stock Exchange regarding trading of a new basket product "the Chicago Basket" ("CMX Basket") dated Oct. 1993 and Simon, George T., Letter on behalf of the Chicago Stock Exchange requesting interpretation of and exemptive relief from various provisions of the Securities Exchange Act of 1934 and certain rules promulgated thereunder in connection with the trading on the Exchange of groups of equity securities ("Basket") dated Sep. 1993.

Robert A. Schwartz; Reshaping the Equity Markets, A Guide for the 1990s, Harper Business, 1991; pp. 93–95.

"Customer Computer to Instinet Application Layer Specification" version 4.1, published Sep. 11, 1992 by Instinet Corporation.

"Computer Interface Manual" Apr. 6, 1993, published by the Cincinnati Stock Exchange.

"Making Connections In Off–Exchange Trading" by Victor Kulkosky, Wall Street & Technology, vol. 11, No. 5, Oct. 1993.

"Investment Manager's Workstation Screen" by PBMS © 1991, 2PBMS, Inc.

"New Shorts" articles, undated and newspaper not identified.

"Portfolio System For Institutional Trading" adertising brochure by Barra, Jefferies and Company, Inc. undated.

"Automated Execution As Springboard to Growth" by Karen Corcella, Wall Street & Technology, 12 vol. 11, No. 3.

Untitled brochure, National Financial, A Fidelity Investments Company, undated, National Financial Services Corporation.

"DDX, Davidsohn Order Execution System", the Davidsohn Group, copyright 1993 George Davidsohn and Son, Inc.

"Total Electronic Trading", Merrin Financial Inc., Sep. 30, 1993.

"Schwab Rolls Out First On–Line Trading Software for Windows; Makes Managing Investments Easier Than Ever", dated Oct. 4, 1993 PR Newswire Association, Inc.

"ITG Links Up With AZX, Bridge" dated Sep. 27, 1993, Institutional Invester Inc., Wall Street Letter.

"Quantex Heads South", dated Sep. 7, 1993, Financial Post Ltd.

"Branch Support: Omaha–Based Kirpatrick Links Five Branchse With Own WAN" dated Jul. 16, 1993, Wall Street Network News.

"PC Quote Announces entry Into Interactive TV Market" dated Jun. 25, 1993, Business Wire Inc.

"Smack–dab in the Middle, Three Technologies Form The Basis For Emerging Middleware, And Each Offers A New Wrinkle For Networking Applications" dated Jun. 21, 1993 by Wayne Eckerson, Network World.

"Desktop systems; Painewebber Empowers Brokers" by Church Appleby, dated Apr. 12, 1993, Information Week.

Trading Room Networks: Carroll Mac Picks SDS for Touch Order Entry, Video, dated Mar. 22, 1993, Trading Systems Technology No. 181 vol. 6, ISSN: 0892–5542.

"Merrill Adds OTC, Mutual Funds to Electronic Order Entry" by Wendy Connett, dated Dec. 21, 1992, Wall Street Letter, vol. XXIV, No. 51; p. 1.

"Merrill Adds Corporate Inventory To Retail Screen System", dated Nov. 30, 1992, BondWeek, vol. XII, No. 48; p. 11.

"Broker Watch: Painewebber to Distribute Quotron Data Via Own Network: Independence is Goal", dated Sep. 28, 1992 Inside Maket Data, No. 1, vol. 8; ISSN: 1047–2908.

"Staying in the Middle . . . Brokers are Fighting to Keep Their Role In the Market; Includes Related Article on Crossing Networks" by Ivy Schmerken dated Dec., 1991 Wall Street Computer Review © Information Access Company; © Dealers' Digest Inc., vol. 9.

"Wall Street Brokers, Merrin Financial Form New Electronic Trading Network" dated Jun. 15, 1993, AFX News.

Wall Street's Quiet Revolution; Technology dated Jun. 1992 by Ivy Schmrkiin, Wall Street & Technology vol. 9; No. 10; p. 25.

"Merrin Financial Introduces the First Automated PC–Based Brokerage Trading System", dated Jul. 20, 1993,, PR Newswire, Financial News.

"The Telephone Game" by Sharen Kindel, dated Oct. 13, 1992, Financial World, Systems User p. 74.

"The Lattice Network" letter by Brandon Becker, Director SEC to Lloyd H. Feller, Esq., Morgan, Lewis & Bockius dated Sep. 9, 1993 SEC Reply 1: Securities and Exchange Commission, Washington, D.C.

"The Lattice Network" letter by Lloyd H. Feller dated Nov. 16, 1992 to Gordon Fuller, Securities and Exchange Commission, Washington, D.C.

Off–exchange trading chips away at NYSE, dated Dec. 1992 by Ivy Schmerken, Wall Street & Technology, vol. 10, No. 4, p. 42.

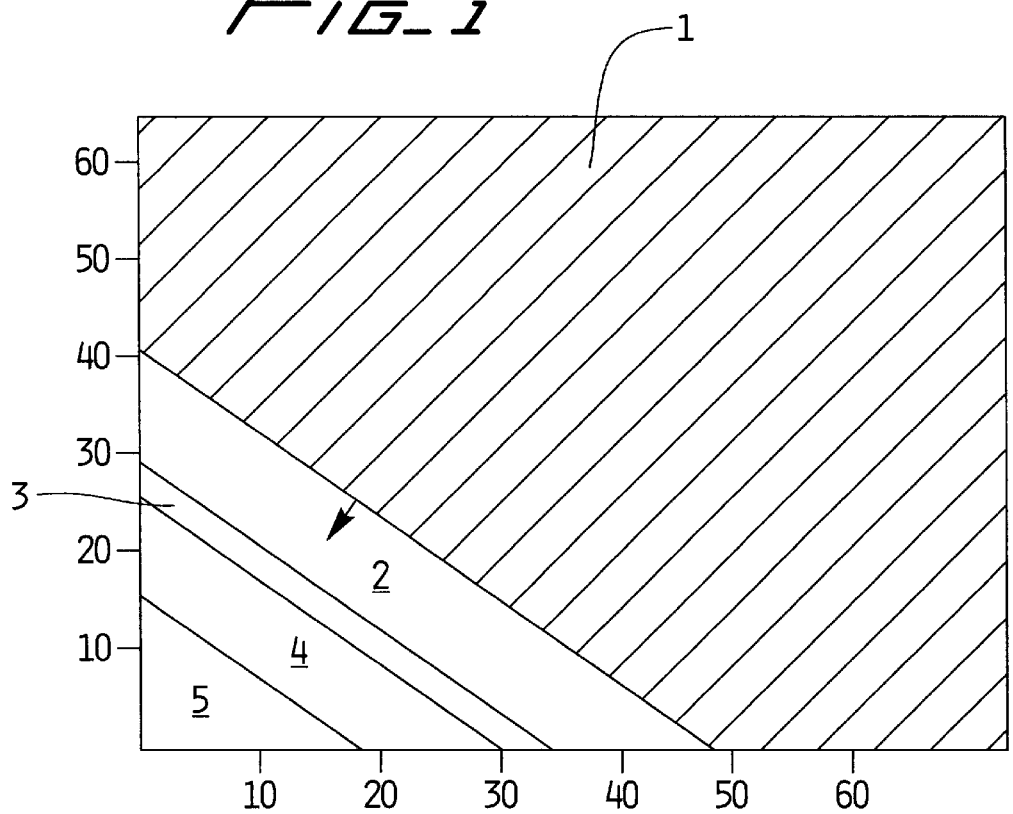
FIG_1
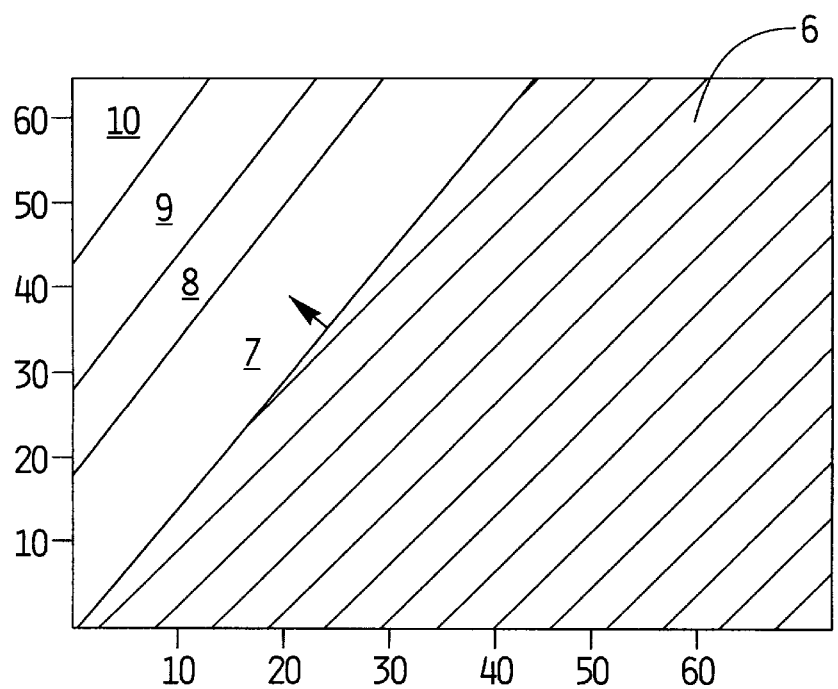
FIG_2

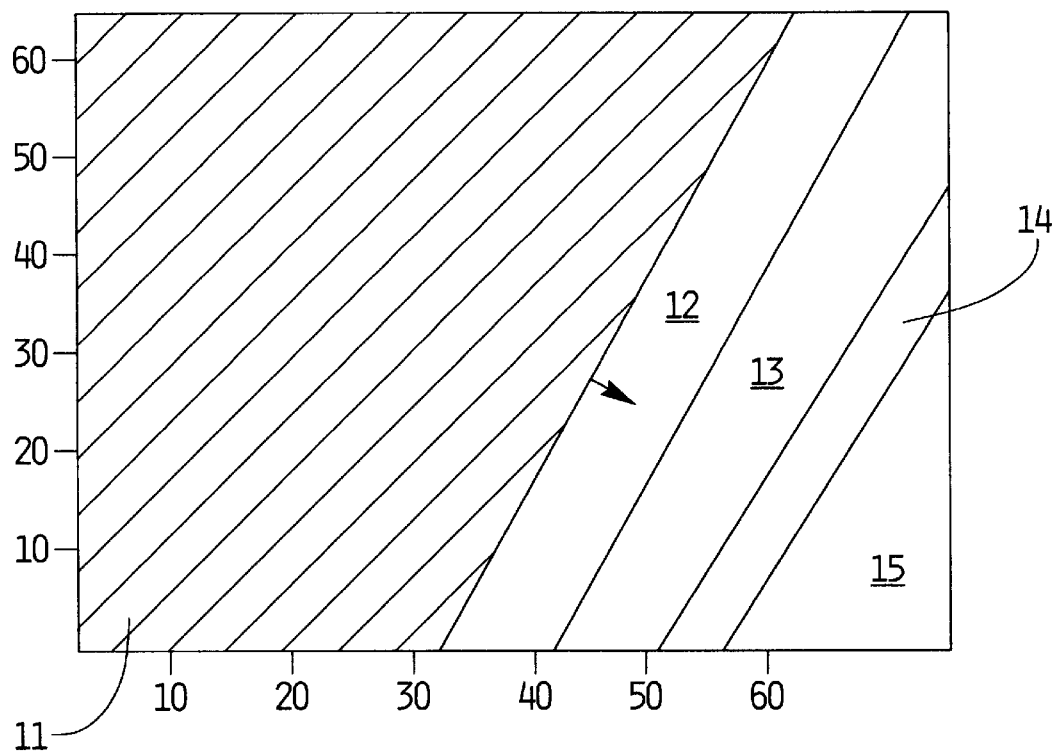
FIG_3
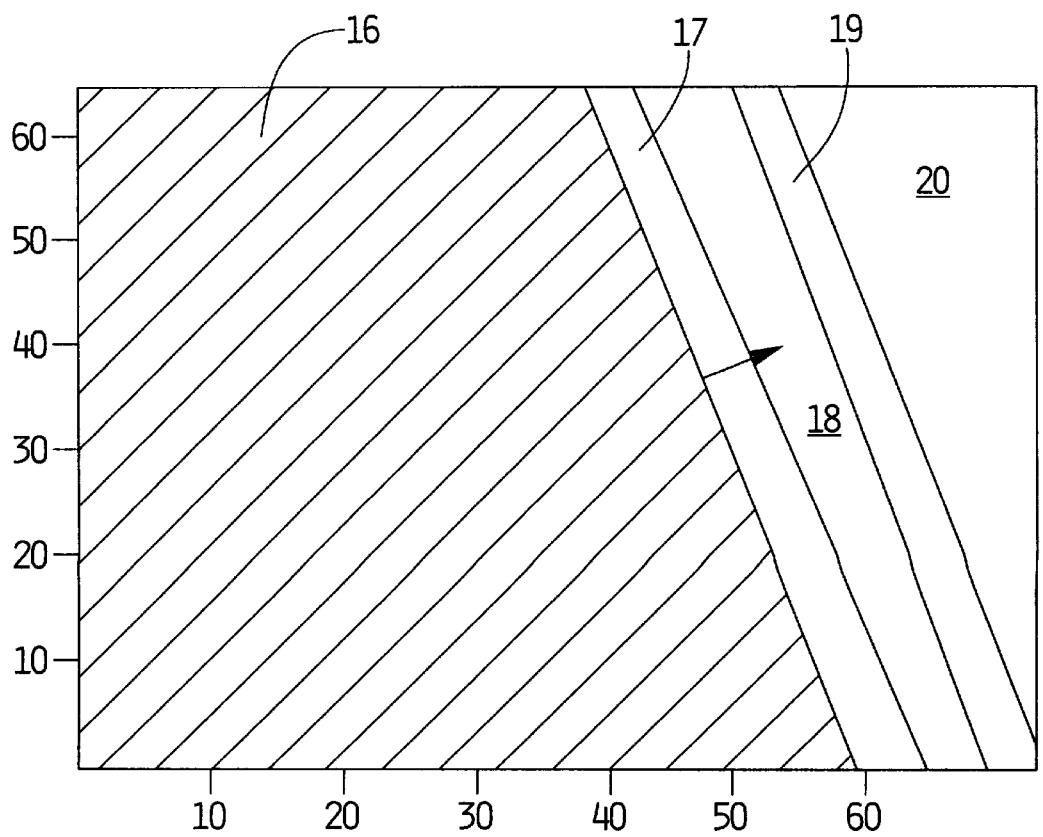
FIG_4

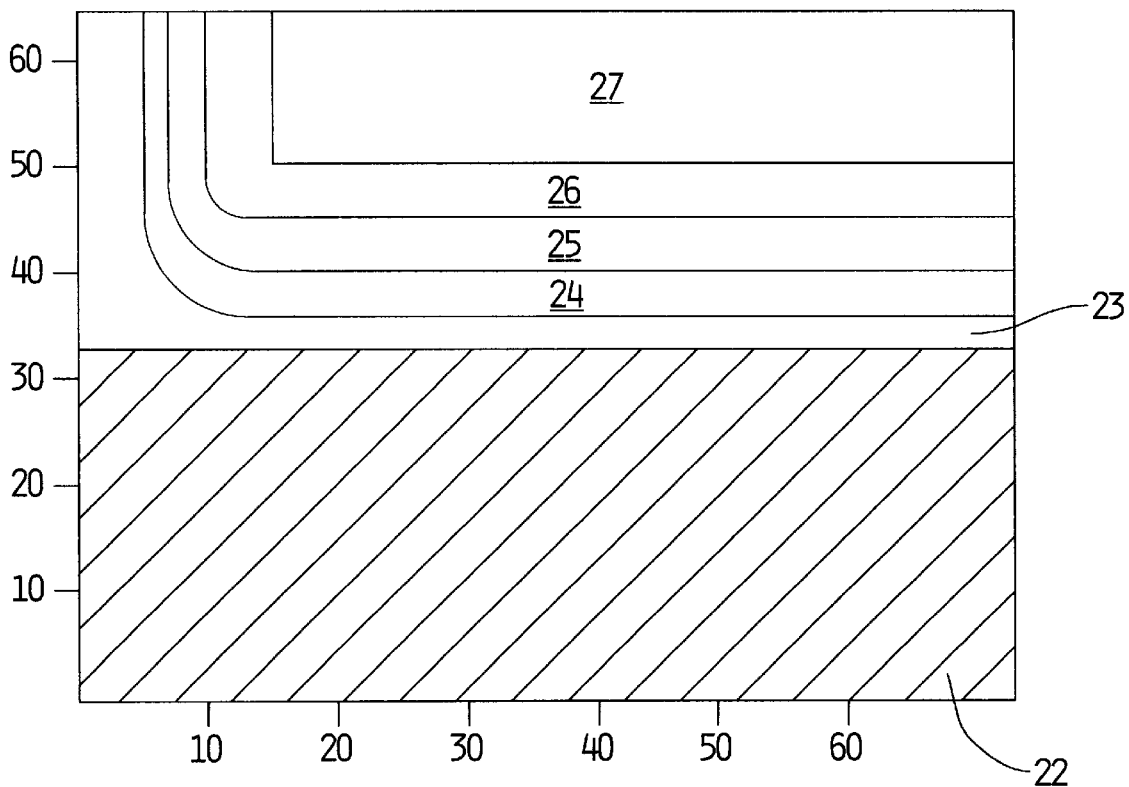
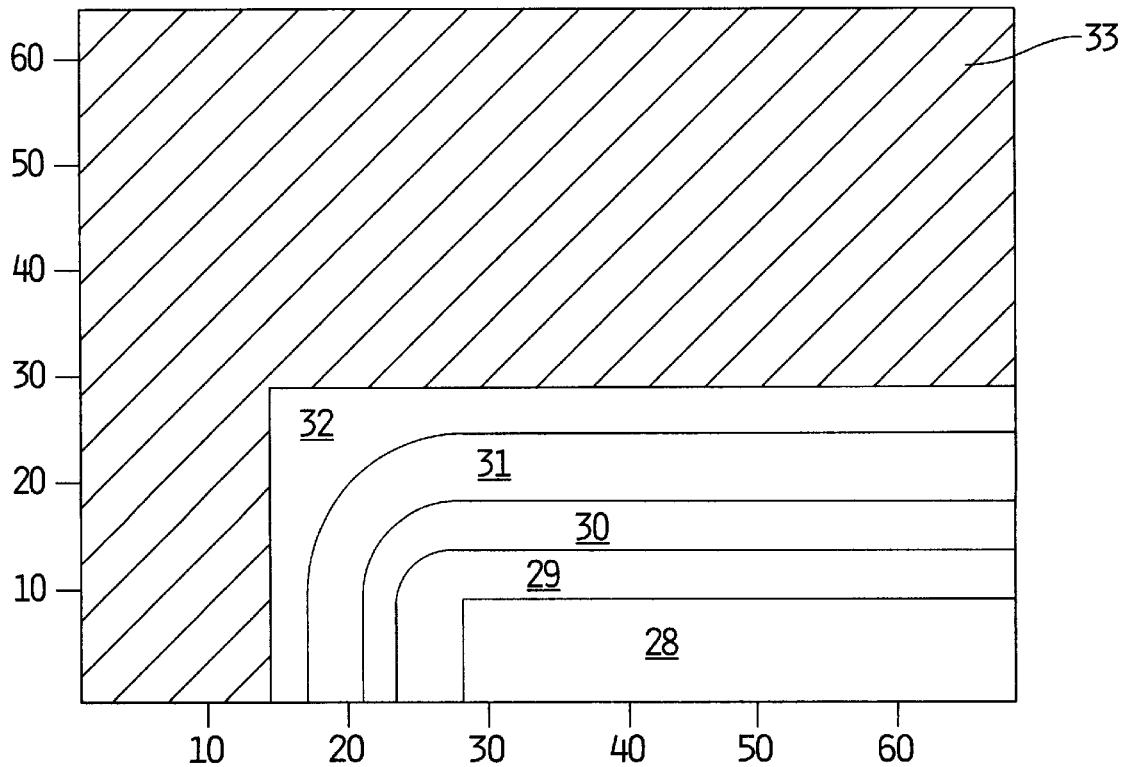

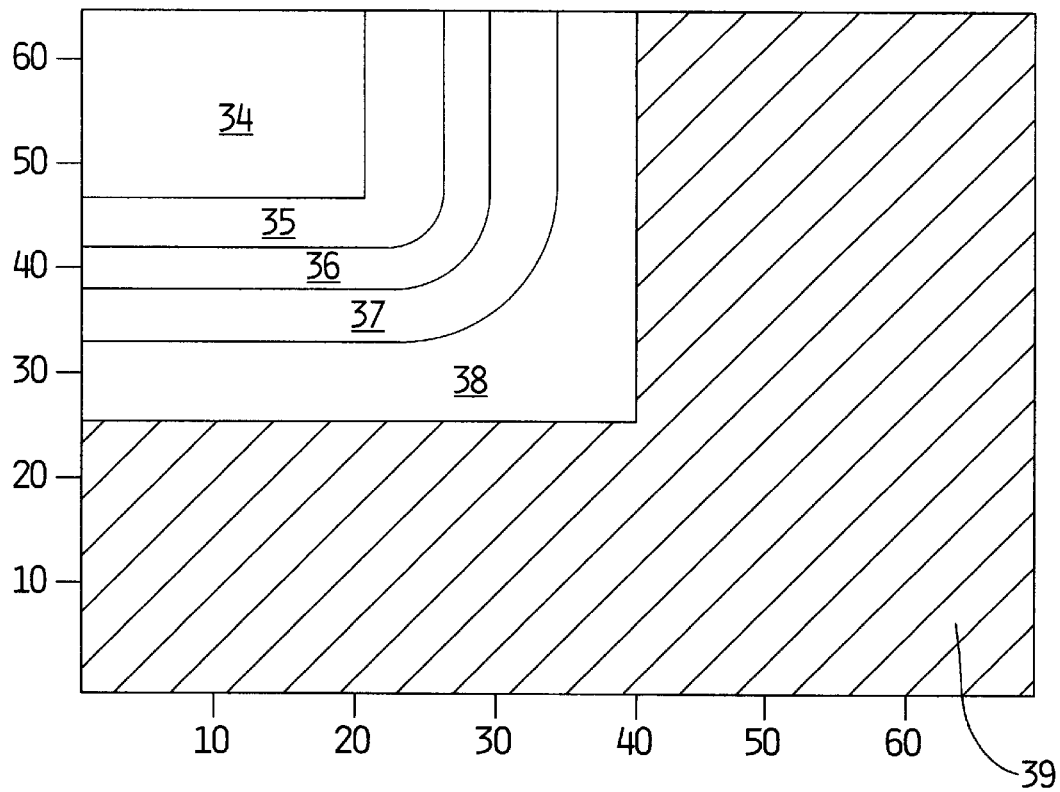
FIG_7
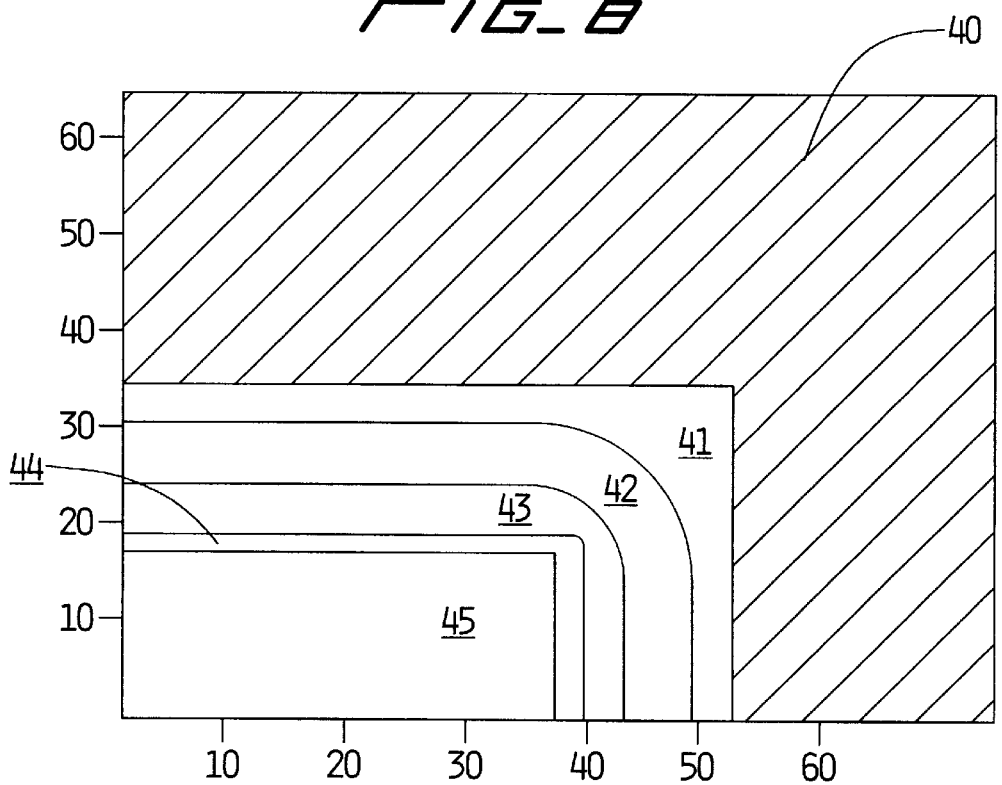
FIG_8

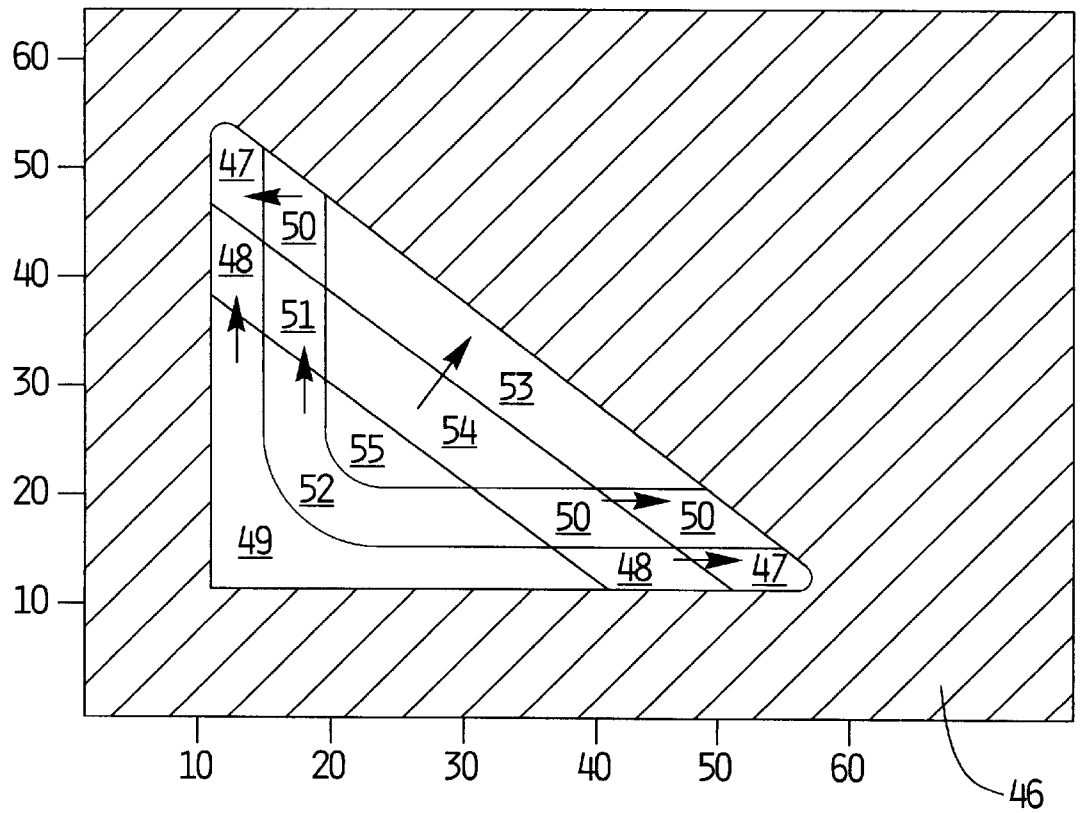
FIG_9
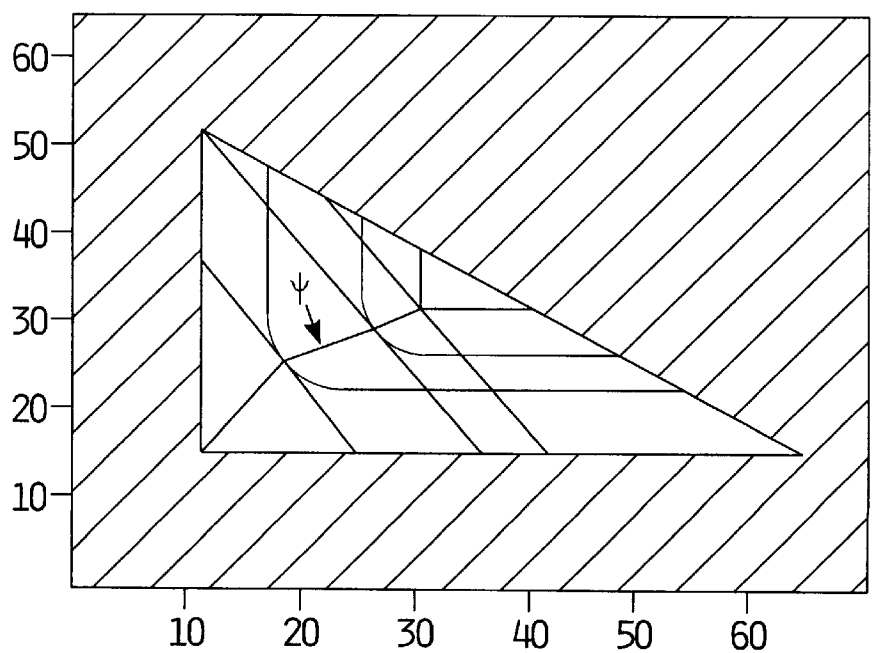
FIG_10

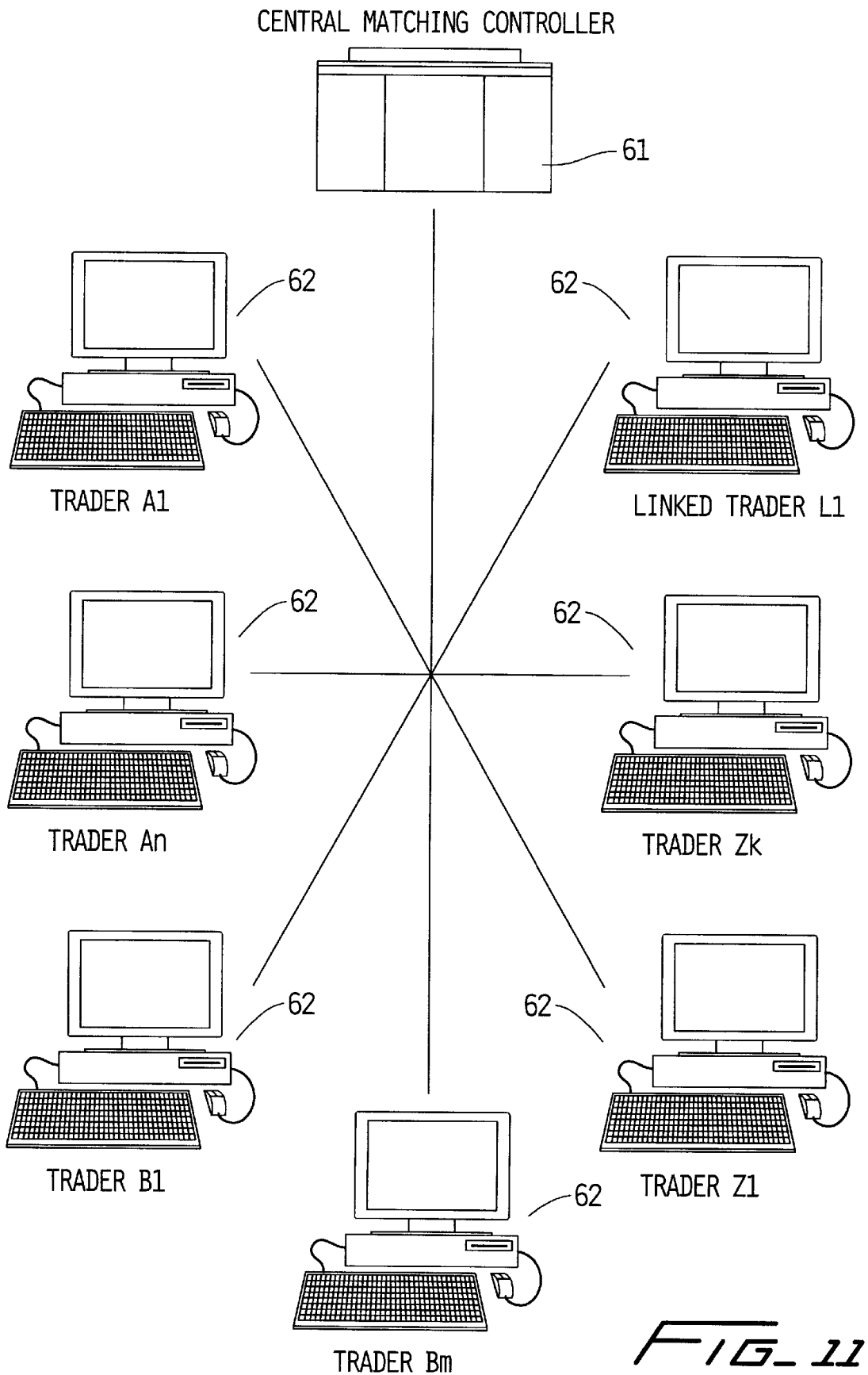
FIG_11

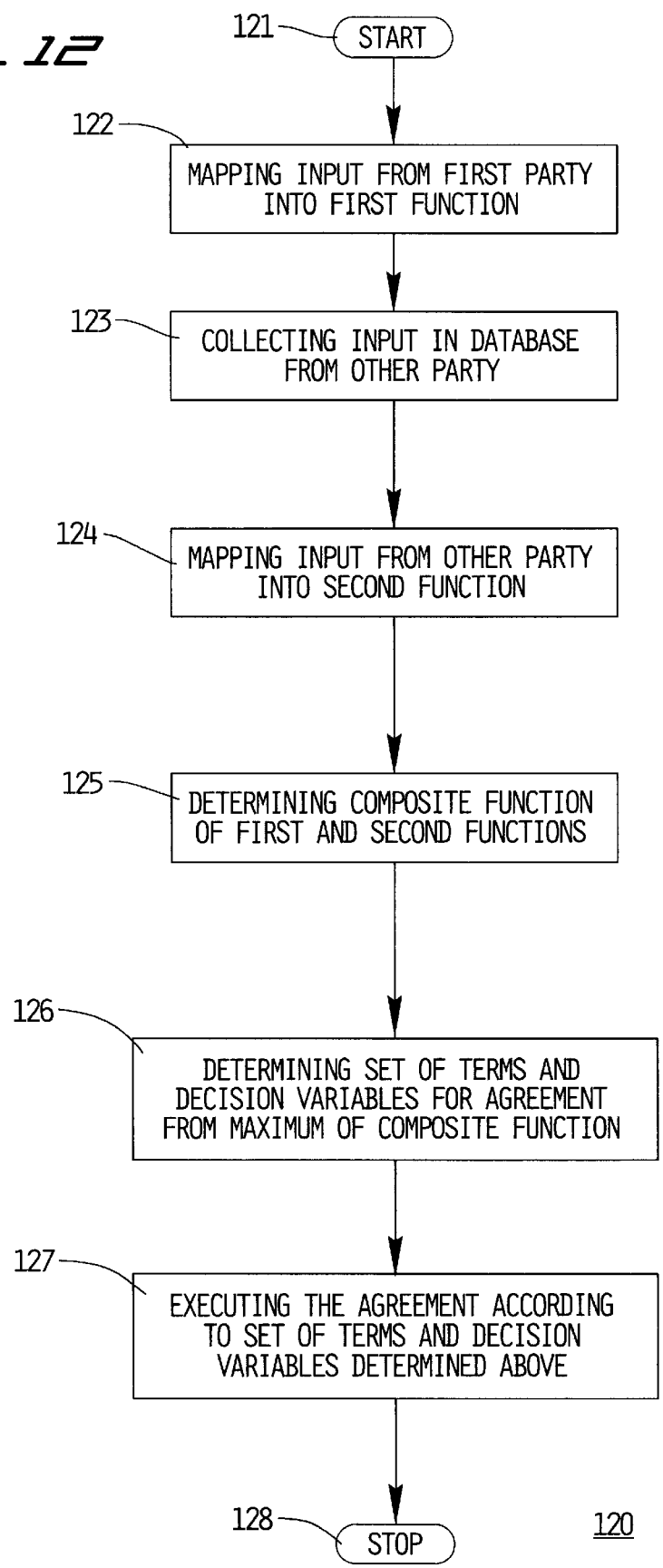

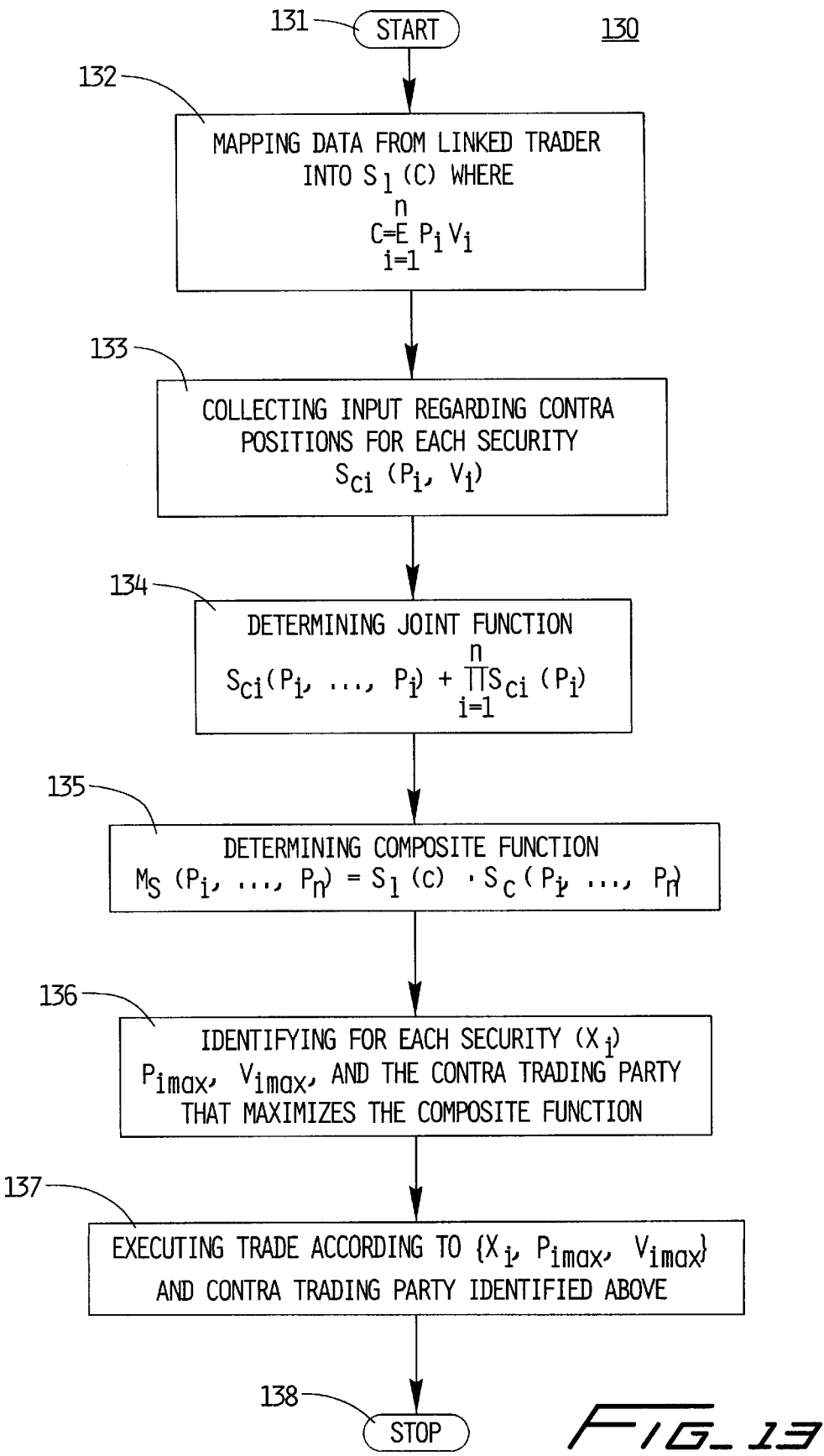
FIG_13

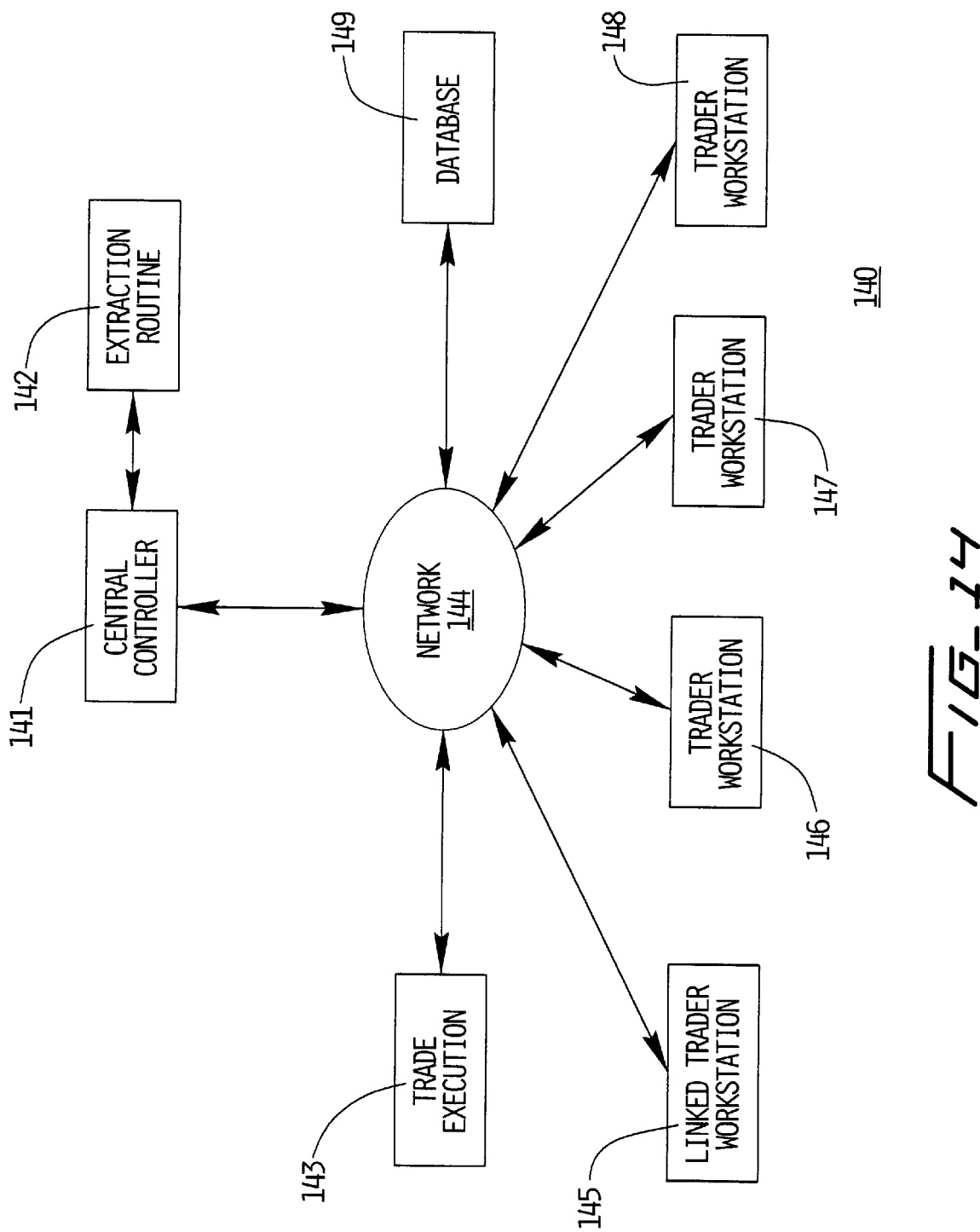

FIG_17

FIG_18

FIG_19

FIG_22

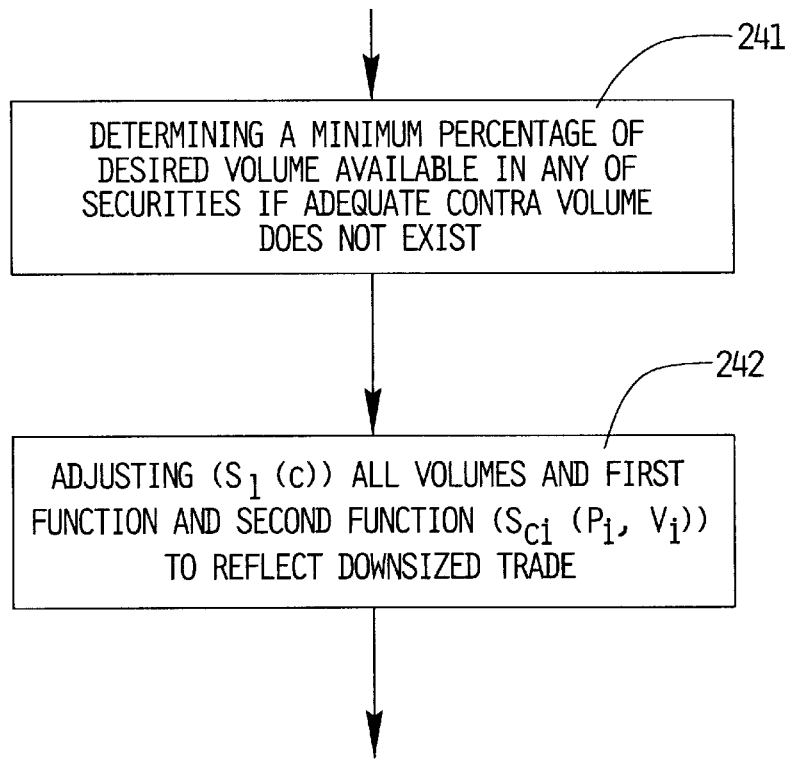
FIG_24
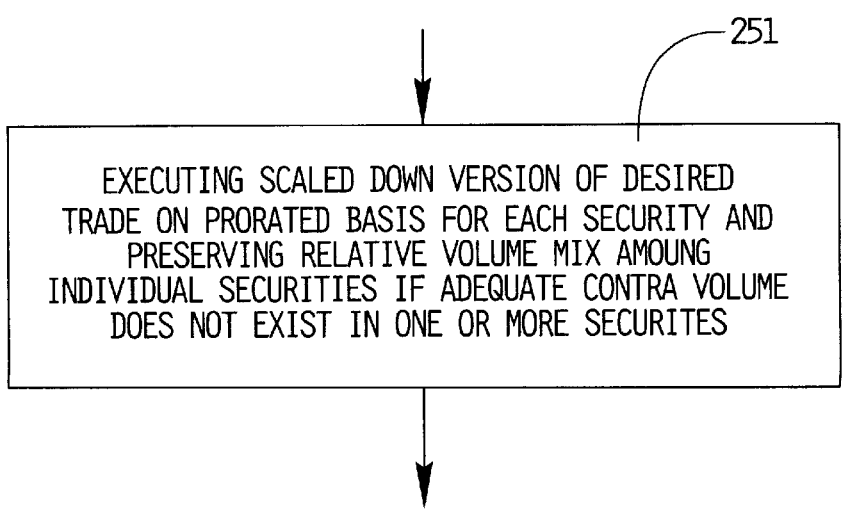
FIG_25

DETERMINING MINIMUM VOLUME AVAILABLE IN EACH SECURITY, NOT TO EXCEED THE DESIRED VOLUME IF ADEQUATE CONTRA VOLUME DOES NOT EXIST IN ONE OR MORE SECURITIES —261

ADJUSTING THOSE VOLUMES THAT ARE LESS THAN THE DESIRED VOLUME AND THE SATISFACTION FUNCTION $S_1(c)$ AND $S_c(P_i, ..., P_n)$ TO —262

FIG_26

PERFORMING ECLECTIC EXECUTION OF DESIRED TRADE, PRESERVING AS MUCH OF ORIGINAL DESIRED VOLUME IN EACH SECURITY AS POSSIIBLE IF ADEQUATE CONTRA VOLUME DOES NOT EXIST IN ONE OR MORE SECURITIES —271

FIG_27

ADJUSTING UPWARD THE VOLUME IN SECURITIES WHERE ADEQUATE LIQUIDITY IS AVAILABLE TO KEEP SAME $S_1(c)$ WHILE ADJUSTING $S_c(P_i, ..., P_n)$ TO REFLECT NEW VOLUMES IF ADEQUATE CONTRA VOLUME DOES NOT EXIST IN ONE OR MORE SECURITIES — 281

FIG_28

EXECUTING TRADE OR SIMILAR OVERALL NET COST TO ORGINAL TRADE, BUT WITH DIFFERENT MIX OF VOLUMES OF REQUISITE SECURITIES — 291

FIG_29

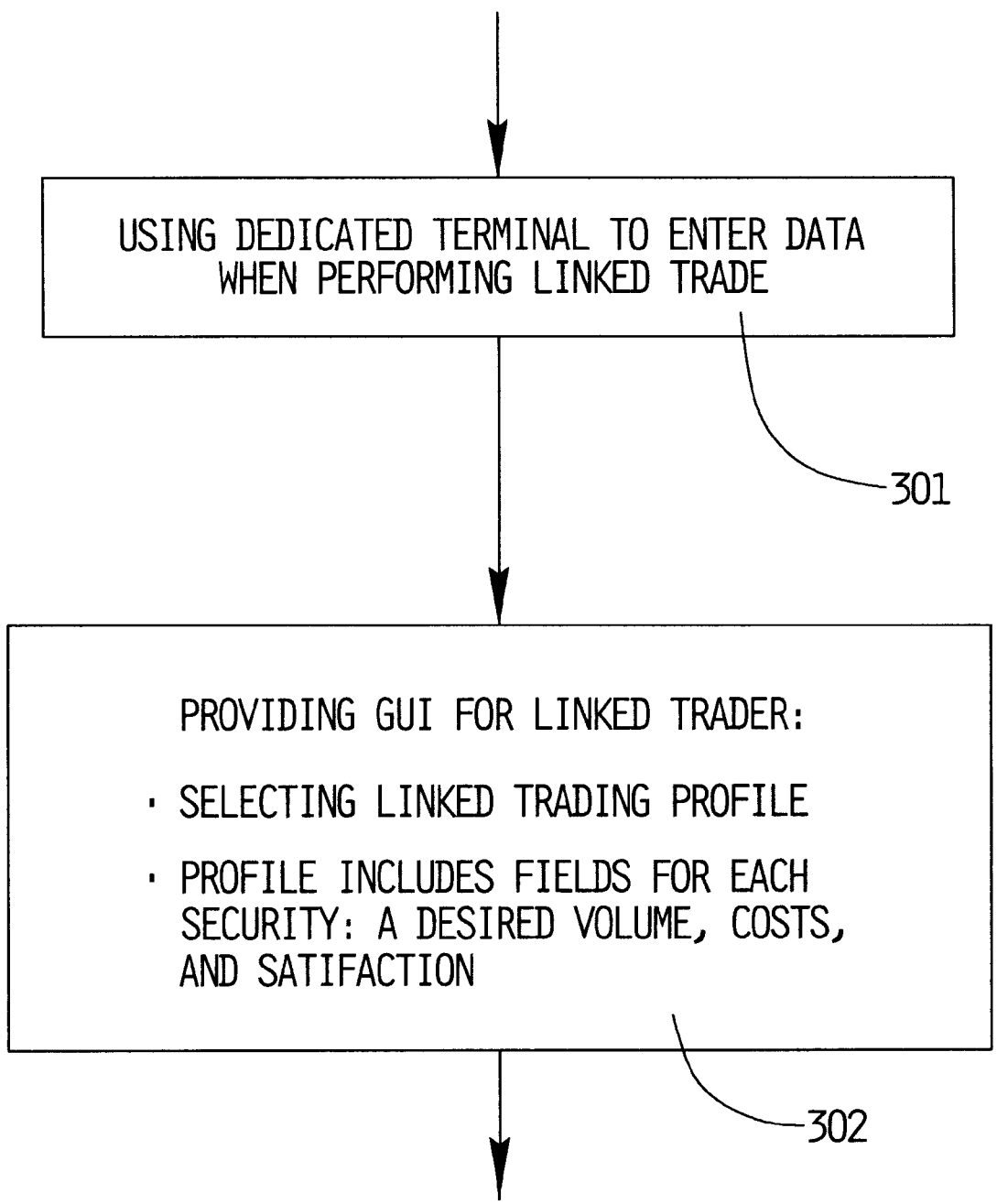

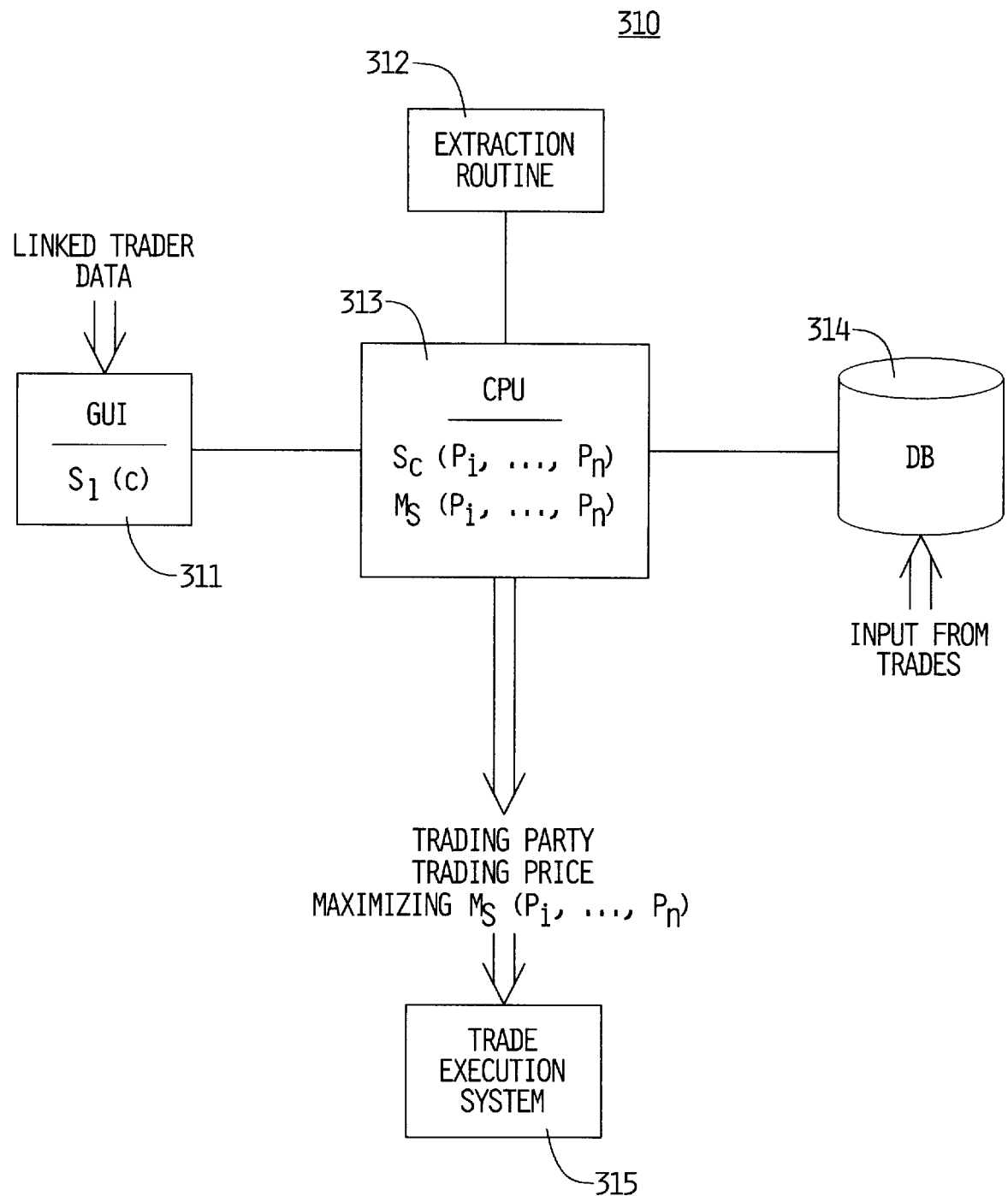
FIG_31

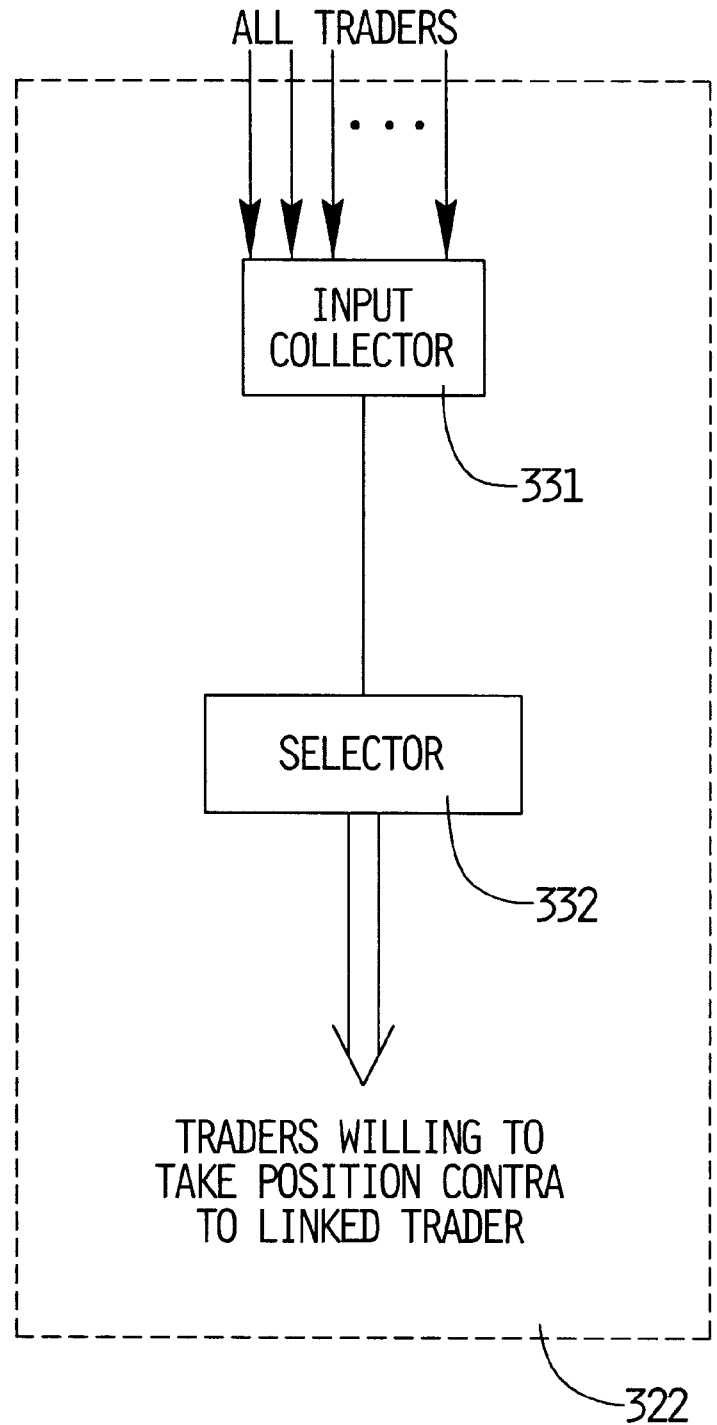
FIG_33

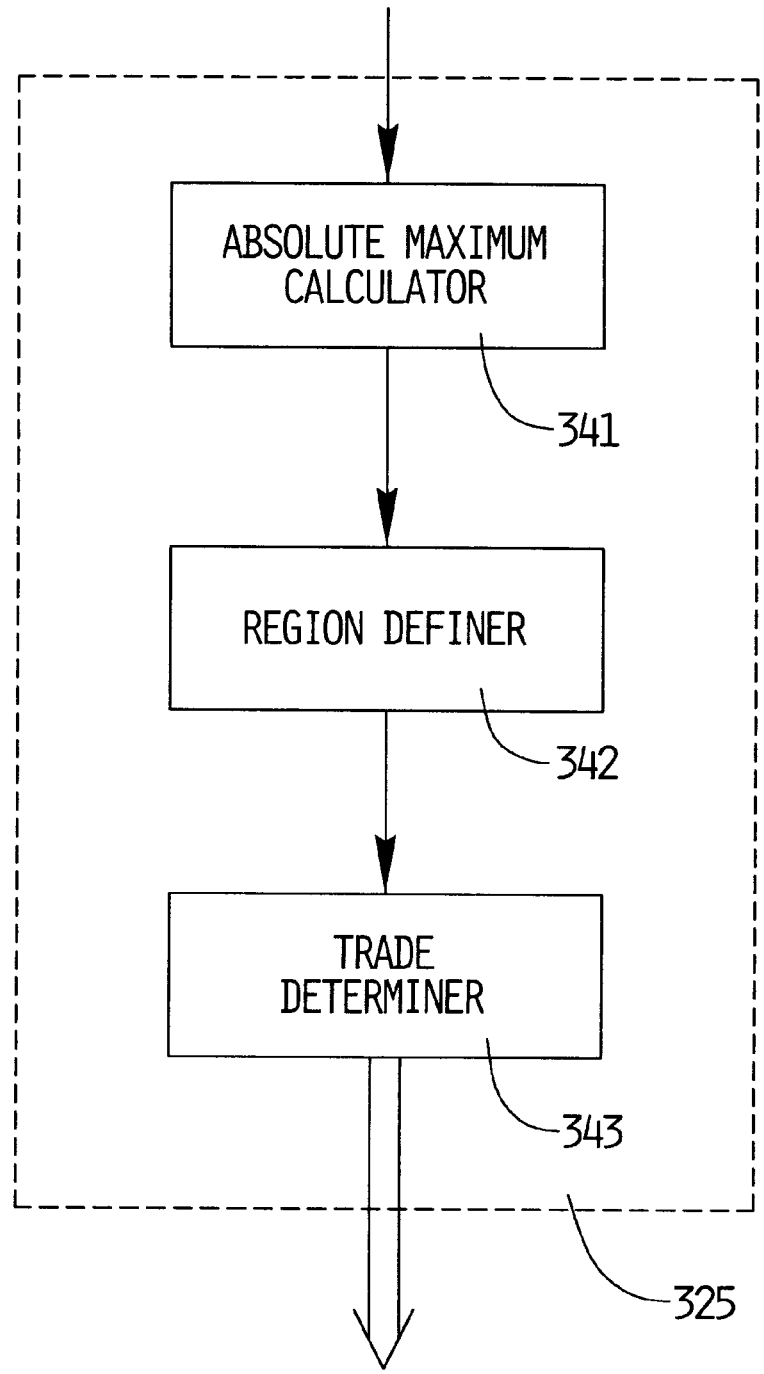
FIG_34

METHOD AND APPARATUS FOR AUTOMATING NEGOTIATIONS BETWEEN PARTIES

BACKGROUND OF THE INVENTION

The present invention relates to U.S. application Ser. Nos. 08/430,212 and 08/110,666, both of which are hereby incorporated by reference as if repeated herein in their entirety, including the drawings.

The present invention relates generally to methods for performing negotiations between parties and more particularly to a method for automatically performing a negotiation between multiple parties without necessarily disclosing the identity and positions of the parties to each other. The present invention also relates generally to methods and apparatuses for performing computerized trading, and more particularly to a method and apparatus for performing computerized trading of multiple securities in a single simultaneous transaction. This is known as "linked trading."

In negotiations, parties often desire to negotiate a deal involving something of value to both parties or multiple parties, but are wary of disclosing their willingness to deal on any variable of the deal for fear of losing any negotiating strength. In fact, it is a well-known negotiating tactic to avoid being the first party to suggest an offer, since that sets the stage for the remaining offers. However, it is practically impossible to negotiate without a starting point.

In today's complex world, these negotiations now often involve multiple parties and multiple terms. Occasionally, the parties do not even know all of the other parties to the transaction, e.g., in large exchanges where trades are made between millions of parties who may never even meet face to face. This presents significant difficulties in reaching an agreement even on a single term, much less between millions of parties who may never even meet face to face. This presents significant difficulties in reaching an agreement even on a single term, much less multiple terms.

One particularly good example of this is securities trading, and in particular linked trading of securities. Many trading strategies in current markets involve simultaneous purchases and/or sales of multiple securities, where the combined transaction must satisfy a prescribed price objective. Simple examples of multiple securities trading include: 1) pairs trading, in which a party is interested in buying one security that is perceived to be undervalued using the proceeds from a simultaneous short sell of a correlated security that is perceived to be overvalued, in expectation that both securities will revert to their nominal values, allowing both positions to be closed out at a profit; and 2) buy-write trades that involve the simultaneous purchase of a stock and sale of a call option on the stock, wherein the call premium received partially hedges the risk of a decline in the value of the stock, at the cost of capping the potential profit of an upside move.

More complex examples of linked trades include extensions of pairs trading to more than two securities. One type of multiple securities trading is known as "basket trading," an example of which is index trading, wherein the objective is to buy or sell a defined set of securities (the basket) in a single transaction. Another example is combined equity-currency trades, in which one is purchasing foreign equity in the native currency and simultaneously effecting the required currency exchange trade. Yet another example are "swaps," wherein one income and/or payment stream is swapped for another. More general extensions can be envisioned, involving an arbitrarily complex set of linked trades across multiple securities types.

All current techniques and systems for implementation of linked trades are inefficient and carry some risk for the party desiring the trade for several reasons. First, the practical requirements of carrying out the multiple trades in significant volume may require hundreds or even thousands of telephone calls and/or keyboard entries into an electronic terminal connected to individual centers of liquidity for the securities involved. Therefore, a common practice among parties to such trades is to employ an intermediary who is willing either to take the contra side of the combined trade, acting as principal, or to negotiate and execute the simultaneous legs of the combined trade, acting as agent. Obviously, this service is not without cost to the original party, and in the case of a principal trade, the intermediary has now assumed the contra position in the corresponding securities, and in most cases, will want to unwind this position over time. In the case of an agency trade, the realized prices, and even the ability to execute the individual legs of the trade, are uncertain, which exposes the original party to financial risks that cannot be controlled in advance of trade implementation.

Second, the costs incurred in link trading are significantly high, especially where the contra position is negotiated with an intermediary acting as the principal in order to enable the trade to occur with certainty. As an example, an intermediary might charge as much as 3% of the total value of the trade on average, and more if the trade involves illiquid securities, to take the contra position.

Finally, index trading, which is a very prevalent example of multiple security linked trading, often incurs substantial "market impact" costs, in addition to the execution costs, as a result of the leakage of information into the marketplace. Adverse price moves in the individual securities making up the index can be arranged to the benefit of other market participants (and the detriment of the party desiring the trade) if the other market participants have information about an impending index trade(s). Thus, the linked trader desires both anonymity of the fact that he is trading in linked securities and non-disclosure of his desired position in each of the securities to the market.

The present invention is therefore directed to the problem of developing a method and system for automatically negotiating an optimum agreement between parties desirous of obtaining such an agreement without necessarily identifying the parties and their positions to each other, which method and apparatus is suitable for performing linked trading in a way that optimizes the trade prices for the participants on both sides of the trades and does so without disclosing the identity of the trader and his position in the securities at issue.

SUMMARY OF THE INVENTION

The present invention solves the above-identified problems by providing a method and system that calculates the mutual satisfaction between the negotiating parties and maximizes this mutual satisfaction over a range of decision variables and does so without requiring the parties to identify themselves and their positions to each other.

According to the present invention for automatically negotiating agreements between multiple parties, a computer accepts a satisfaction profile from an offering party who defines his degree of satisfaction to agree to a range of terms upon which the party is desirous of negotiating as a function of the relevant decision variables. The computer then accepts input from all other parties regarding their degree of satisfaction to agree to each of the terms as a function of a particular relevant decision variable. The computer then calculates a satisfaction profile for each of these terms based on all of the individual inputs. Next, the computer calculates a joint satisfaction profile for all of the terms as a function of the particular relevant decision variables, and then calculates the mutual satisfaction function for the offering party and the other parties, also as a function of the particular relevant decision variables. Finally, the computer calculates the decision variable values yielding the maximum mutual satisfaction and provides this output to the parties.

According to the present invention, a method for automatically trading linked securities includes the steps of receiving a satisfaction function from an offering party who defines its degree of satisfaction to trade multiple securities simultaneously based on the overall cost of the transaction, receiving a satisfaction profile from other traders who indicate their degree of satisfaction to trade particular securities as a function of price/volume, creating a composite satisfaction function for each of the individual securities from the input of all of the individual traders, creating a joint satisfaction function for all of the securities from all of the satisfaction density functions, creating a mutual satisfaction function from the joint satisfaction function and the satisfaction density profile entered by the offering party, maximizing the mutual satisfaction function, which establishes a set of prices, volumes and parties for trading each of the individual securities, and executing a trade in the multiple securities simultaneously with the identified parties at the prices and volumes established by the maximum mutual satisfaction.

According to the present invention, a system for automatically trading linked securities includes a linked trading workstation at which a linked trader can input a desired linked trade and a satisfaction function that defines its degree of satisfaction to trade multiple securities simultaneously based on the overall cost of the transaction, a plurality of trader workstations at which individual securities traders can enter a satisfaction density profile that indicates their degree of satisfaction to trade particular securities as a function of price/volume, a central control engine determining: (1) a composite satisfaction function for each of the individual securities based on the input of the traders, (2) determining a joint satisfaction function for all of the securities from these satisfaction functions, (3) determining a mutual satisfaction function from the joint satisfaction function and the satisfaction function entered by the linked trader, (4) maximizing the mutual satisfaction function, which establishes a set of prices, volumes and parties for trading each of the individual securities, and executing simultaneously a trade among the identified parties for the multiple securities at the established prices and volumes.

BRIEF DESCRIPTION OF THE DRAWINGS

FIG. 1 depicts a satisfaction contour plot of $S_L(c)$ for the case of buying one unit of $X_1$ and buying two units of $X_2$, respectively.

FIG. 2 depicts a satisfaction contour plot of $S_L(c)$ for the case of buying one unit of $X_1$ and selling two units of $X_2$, respectively.

FIG. 3 depicts a satisfaction contour plot of $S_L(c)$ for the case of selling one unit of $X_1$ and buying two units of $X_2$, respectively.

FIG. 4 depicts a satisfaction contour plot of $S_L(c)$ for the case of selling one unit of $X_1$ and selling two units of $X_2$, respectively.

FIG. 5 depicts a contra-side satisfaction contour plot of $S_C(P_1, P_2)$ for the case of selling one unit of $X_1$ and selling two units of $X_2$, respectively.

FIG. 6 depicts a contra-side satisfaction contour plot of $S_L(c)$ for the case of selling one unit of $X_1$ and buying two units of $X_2$, respectively.

FIG. 7 depicts a contra-side satisfaction contour plot of $S_C(P_1, P_2)$ for the case of buying one unit of $X_1$ and selling two units of $X_2$, respectively.

FIG. 8 depicts a contra-side satisfaction contour plot of $S_L(c)$ for the case of buying one unit of $X_1$ and buying two units of $X_2$, respectively.

FIG. 9 depicts a contour plot of $MS(P_1, P_2)$ for the case of buying one unit of $X_1$ and buying two units of $X_2$, respectively.

FIG. 10 depicts the segment $\Psi$, representing the locus of points of tangency between satisfaction contours of $S_L(c)$ and $S_C(P_1, P_2)$.

FIG. 11 depicts one embodiment of the system of the present invention for implementing the method of the present invention.

FIG. 12 depicts one exemplary method according to the present invention for automatically determining a set of terms of an agreement between at least two parties.

FIG. 13 depicts one exemplary method according to the present invention for automatically determining trading prices, volumes and trading parties to a simultaneous trade of different securities.

FIG. 14 depicts one exemplary embodiment of a system for automatically trading linked securities according to the present invention.

FIGS. 24–29 depict various exemplary embodiments of additional steps to be performed in the case of insufficient liquidity in the exemplary embodiment of the method of the present invention depicted in FIG. 13.

FIG. 30 depicts additional steps to be performed in an exemplary embodiment of the method of the present invention.

FIG. 31 depicts one exemplary embodiment of an apparatus according to the present invention.

FIG. 33 depicts an exemplary embodiment of the input collector shown in FIG. 32 according to the present invention.

FIG. 34 depicts an exemplary embodiment of the composite function maximizer shown in FIG. 32 according to the present invention.

DETAILED DESCRIPTION

Figure 15:
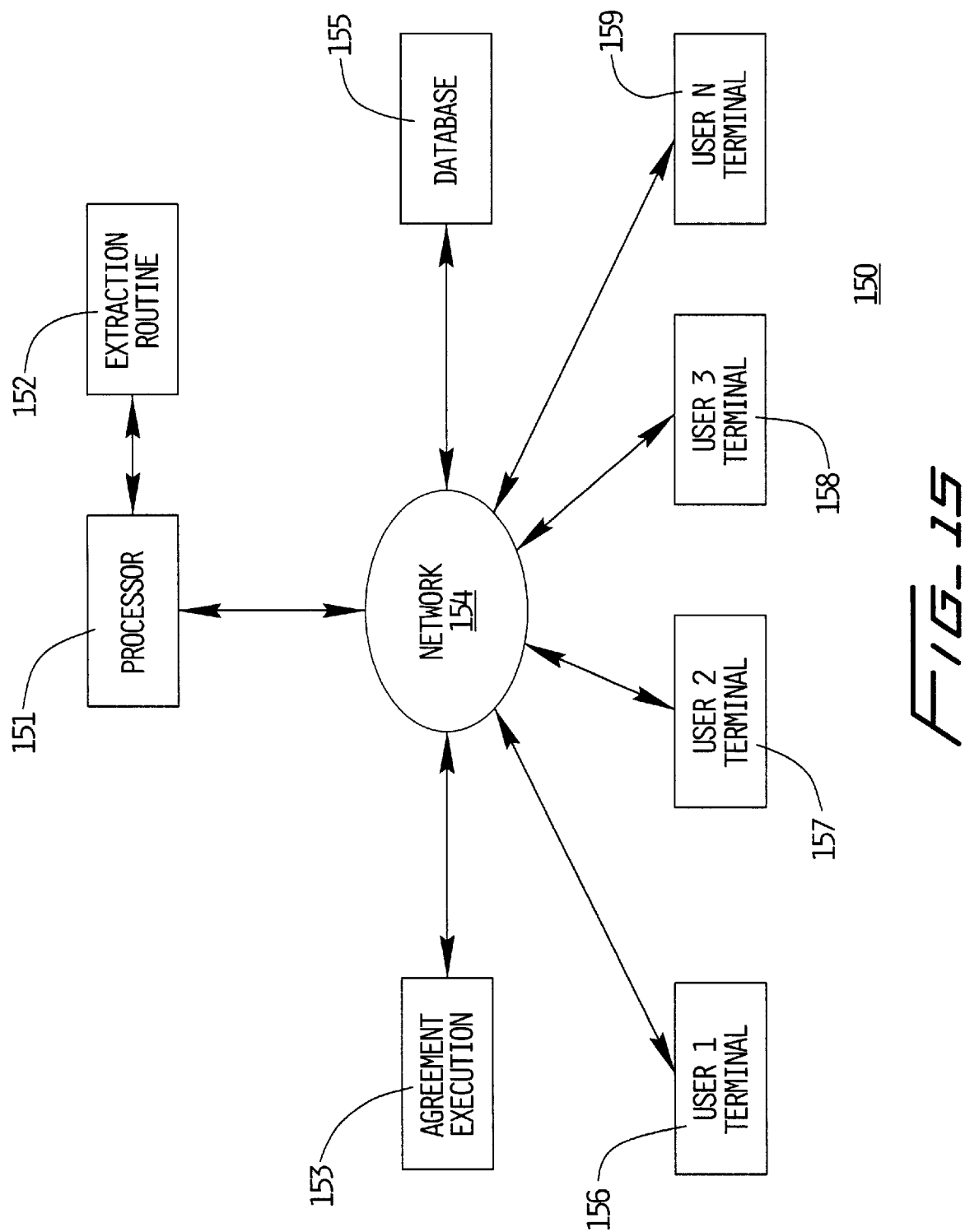
FIG. 15 depicts one exemplary embodiment of a system for automatically determining a set of terms of an agreement between a first party and at least one other party according to the present invention.

The present invention provides a novel method for enabling parties to negotiate with each other both quickly and easily without disclosing their willingness to negotiate on specific terms and in fact without necessarily disclosing their identities. In its broadest sense, the present invention is a tool that can discover areas of overlap in negotiating positions between parties having a mutual desire to enter into some type of agreement. The applications to which the present invention may be applied are as varied as the imagination of the users. Some examples are disclosed below, however, these are merely indicative of the broad range of possibilities. While the present invention is described mainly herein in the context of securities trading, it is equally applicable to other linked trading applications involving non-securities goods and services, such as commodities, etc. One possible example is as follows.

Airline Negotiations Example

If a party, such as an airline, wishes to negotiate with three unions, such as he airline pilots, the flight attendants and the mechanics unions, the party might employ the present invention. Assuming the airline had a fixed cost (i.e., salaries, benefits, etc.) in mind that it could pay to all employees, and with some constraints, it did not care which unions were paid more than the others, the airline would employ the present invention as follows. First, the party would determine its satisfaction function based on its understanding of its industry and needs and quantify its desired terms and satisfaction for agreeing to these terms. The method for determining this satisfaction function is different for each industry and participant, and hence is beyond the scope of this invention, but is well understood to those who are responsible for managing companies in these industries. The airline would then enter this data into a computer and transmit that data to the control engine. Each of the three unions would be provided templates for entering their degree of satisfaction for agreeing to the terms, which templates correspond to the arrangement of data of the airline. However, some terms might not necessarily apply to all participants. By enabling the unions and the airline to enter their degree of satisfaction without disclosing it to the other, the present invention permits the parties to be more aggressive in specifying terms upon which they might agree. For example, knowing that an earlier agreement might get them more of the total funds available one of the unions might agree to lower wages initially then they might otherwise.

Once all of the data is entered into the system, the system calculates the satisfaction function for each individual term, and then calculates the joint satisfaction function for all of the terms. Finally, the system calculates the mutual satisfaction by determining the area of overlap between the joint satisfaction function and the offering party's satisfaction function. The maximum point of this mutual satisfaction is then determined, which establishes the terms for each of the parties and the overall agreement is then specified. The maximum value of the mutual satisfaction may not lie exactly on a discrete term, but may be located between two terms, in which case the nearest term is used. Furthermore, once a point within some tolerable degree is located, then finding the absolute maximum is not necessary and the search can then end.

According to the present invention, a method 120 for automatically determining a set of terms of an agreement between a first party and at least one other party follows the steps outlined in FIG. 12. Upon start (step 121), in step 122, the input from the first party regarding the terms of the agreement is mapped into a first function expressing a degree of satisfaction of the first party to agree to the terms over a range of decision variables. Next, in step 123, input from at least one other party regarding the degree of satisfaction of the other party to enter into an agreement with the first party on the terms is collected in a central database. In step 124, the input from the other party is mapped into a second function expressing a degree of satisfaction of the other party to agree to the terms as a function of decision variables in each of the terms. Then in step 125, a composite function of the first function and the second function is determined. The composite function represents a mutual degree of satisfaction between the first party and the other party to agree to the terms. Next in step 126, a set of terms and decision variables for the agreement from a maximum of the composite function is determined. Finally, in step 127, an agreement according to the set of terms and decision variables determined above is automatically executed. The method then ends in step 128.

Figure 19:
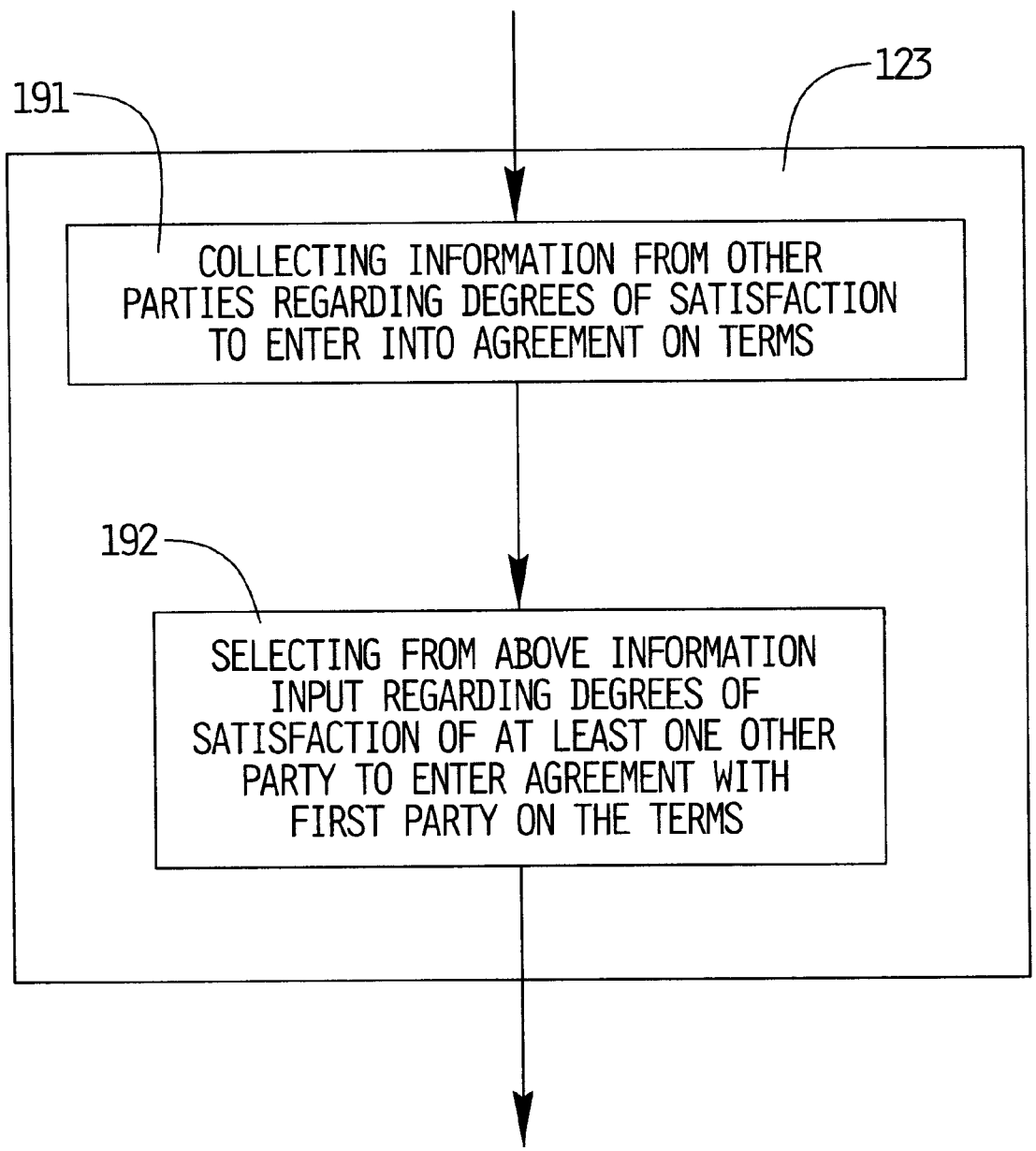
FIG. 19 depicts one exemplary embodiment of the sub-steps involved within the step of collecting input from other parties shown in FIG. 12 according to the present invention.

Referring to FIG. 19, shown therein are additional substeps according to one exemplary embodiment of the present invention for performing the input collection step 123. First in step 191, information from other parties regarding the degrees of satisfaction of the other parties to enter into an agreement about the terms is collected. Next, in step 192 from the information collected in step 191, the input regarding the degrees of satisfaction of the one other party to enter into the agreement with the first party in each of the terms in the agreement is selected.

Figure 20:
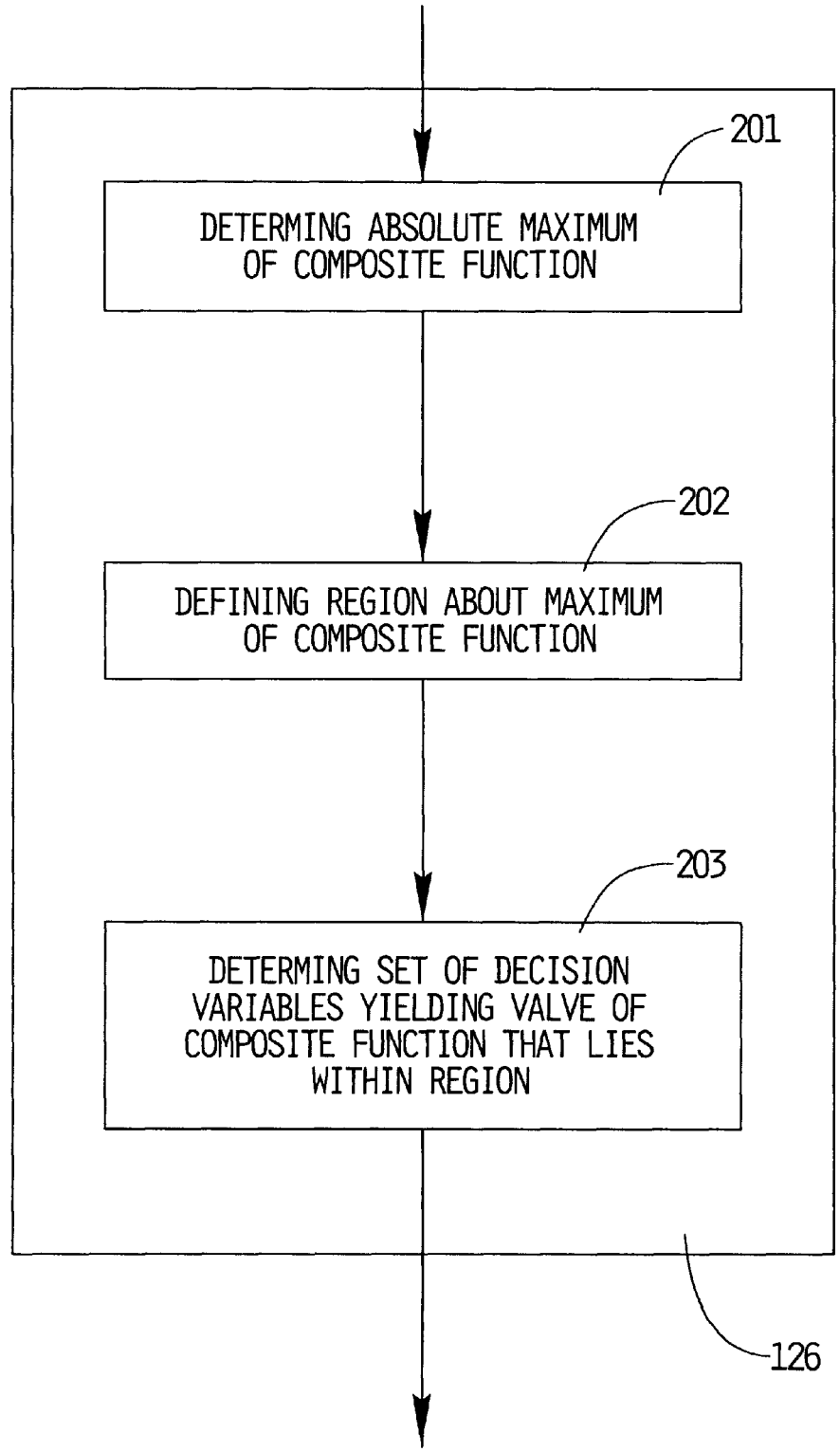
FIG. 20 depicts one exemplary embodiment of the sub-steps involved within the step of determining the set of terms that maximizes the composite function shown in FIG. 12 according to the present invention.

Referring to FIG. 20, shown therein are additional substeps according to one exemplary embodiment of the present invention for performing step 126. First in step 201, an absolute maximum value of the composite function is determined. Next in step 202, a region about the absolute maximum value of the composite function is defined. Finally in step 203, a set of decision variables yielding a value of the composite function that lies within the region defined in step 202 is determined.

Figure 21:
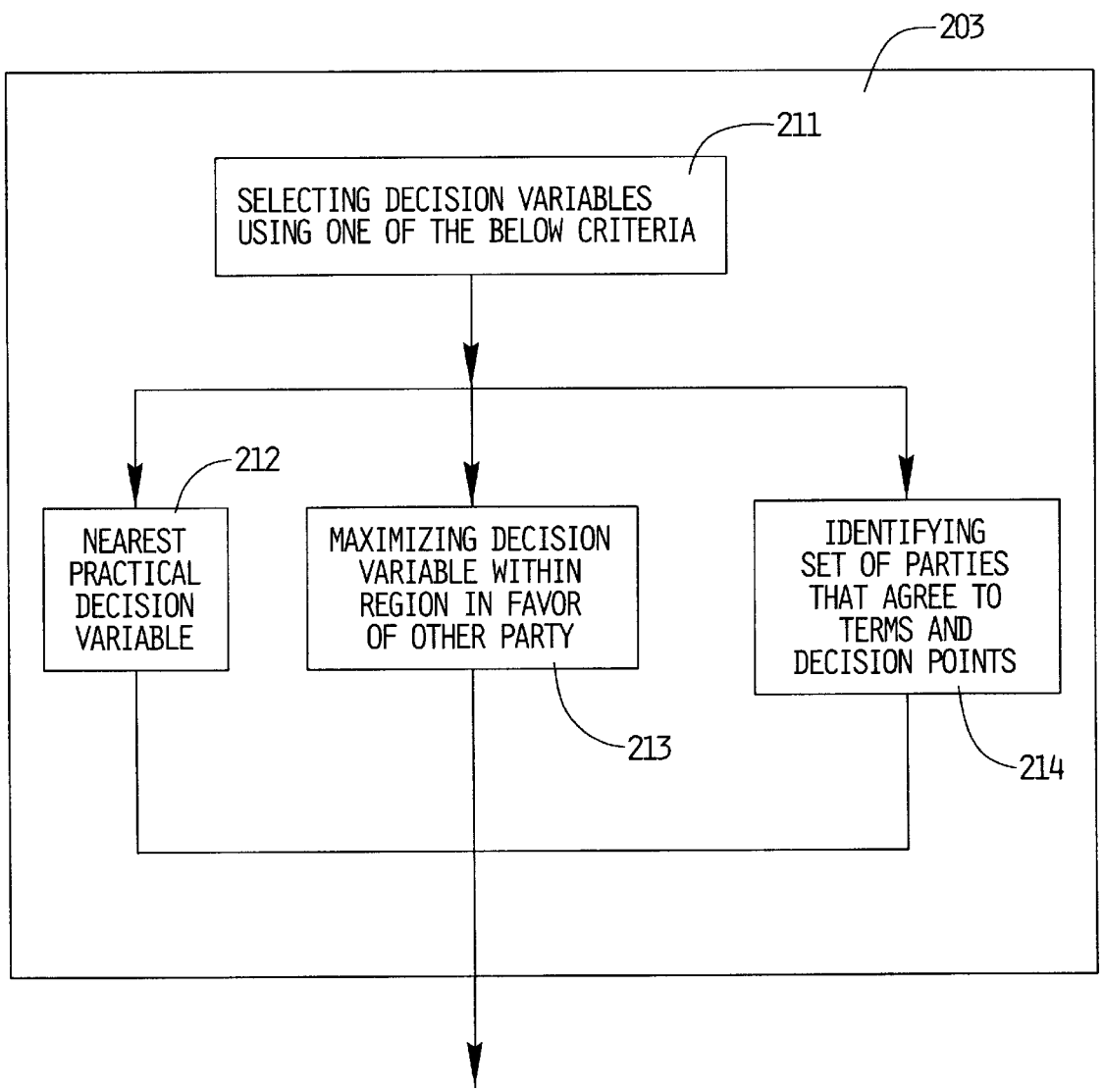
FIG. 21 depicts one exemplary embodiment of the sub-steps involved within the step of determining the set of decision variables that yields a value of the composite function that lies within the region shown in FIG. 20 according to the present invention.

Referring to FIG. 21, shown therein are additional substeps according to one exemplary embodiment of the present invention for performing step 203. First, the set of decision variables using a predetermined criteria is selected by performing either of the steps 212–214. In step 212, the predetermined criteria includes a nearest practical decision variable. In step 213, the predetermined criteria includes maximizing the decision variable in favor of the one other party within the region. In an alternative embodiment also shown in FIG. 21, in the case of multiple parties, step 203 further includes step 214 in which a set of parties that agree to the set of terms and decision points is identified.

Securities Trading Example

A more concrete example can be found in the securities trading arena. U.S. patent application Ser. No. 08/430,212, which has been incorporated by reference above describes the concepts of satisfaction-based representations of mutual trading desire and optimization of trading parameters on the basis of mutual satisfaction. The same concepts are used in the present invention for the individual securities traders.

With regard to the present invention, inter alia, this patent application discloses a method that a linked trader uses to enter its orders to buy or sell multiple securities simultaneously in the form of a satisfaction function. The present invention differs from this prior patent application in that it matches the multitude of individual orders with the linked trade order to perform the linked trade and maximizes the satisfaction of all traders involved.

According to the present invention, a method 130 for determining trading parties, trading prices and trading volumes for simultaneous trading of different securities includes the steps depicted in FIG. 13. Upon start (step 131) in step 132, the data from a linked trader regarding a simultaneous trade of different securities as a group is mapped into a first function expressing degrees of satisfaction of the linked trader to trade the different securities simultaneously as a group over a desired range of costs. Next in step 133, input from other traders regarding a degree of satisfaction of each of the other traders to take a position opposite to the linked trader in at least one of the different securities as a function of price is collected in a central database. Next in step 134, from the input of the other traders a joint function is determined. The joint function expresses a joint degree of satisfaction by one or more traders among the other traders to take an opposite position in all of the different securities as a function of price in each of the different securities. Next in step 135, a composite function of the first function and the joint function is determined. The composite function represents a mutual degree of satisfaction to execute a trade in all of the different securities between the linked trader and the one or more traders among the other traders. Next in step 136, for each of the different securities, a trading price, a trading volume and a trading party among the one or more traders within the other traders that maximizes the composite function are identified. Finally in step 137, a trade in the different securities at the trading prices and the trading volumes identified above is executed simultaneously with the linked trader and the identified trading parties. The method then ends in step 138.

Figure 16:
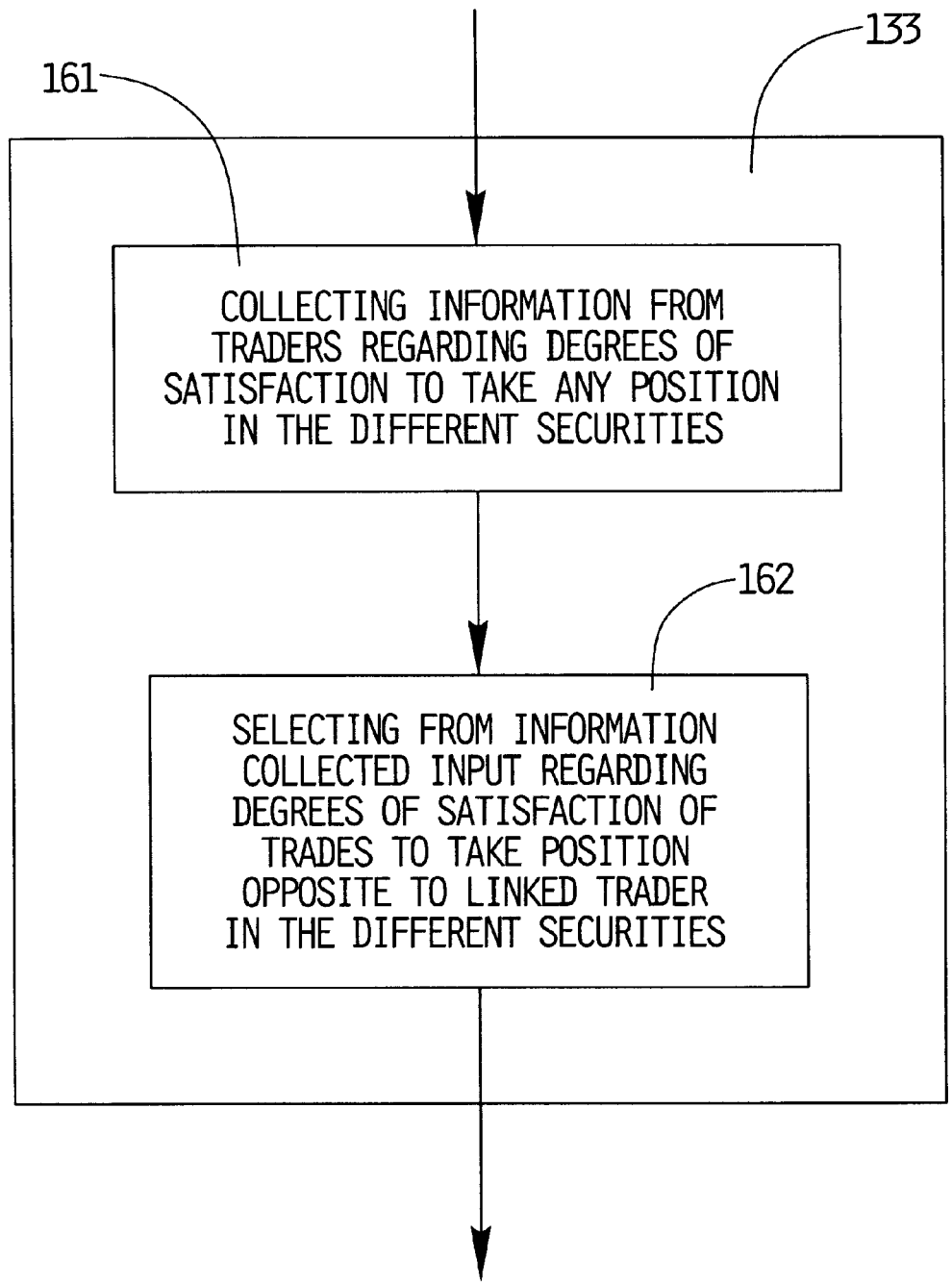
FIG. 16 depicts one exemplary embodiment of the sub-steps involved within the step of collecting input from other parties shown in FIG. 13 according to the present invention.

Referring to FIG. 16, according to one embodiment of the present invention, the step of collecting 133 includes two additional steps, 161, 162. First in step 161, information from the traders is collected regarding the degrees of satisfaction of the traders to take either position in the different securities. Next in step 162, from the information collected in stop 161, the input is selected regarding the degrees of satisfaction of the traders to take a position opposite to the linked trader in each of the different securities.

Figure 17:
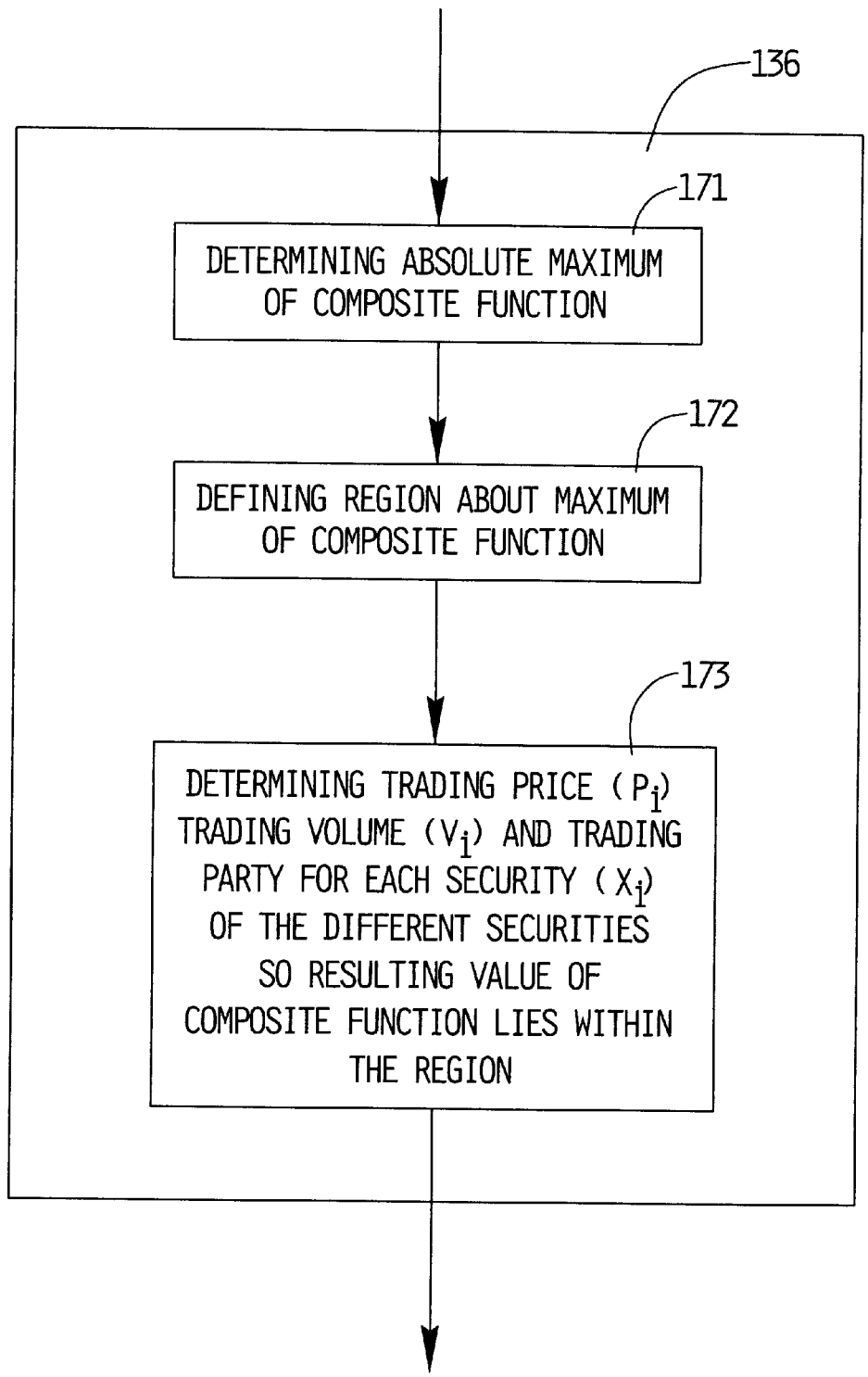
FIG. 17 depicts one exemplary embodiment of the sub-steps involved within the step of identifying for each security the data that maximizes the composite function shown in FIG. 13 according to the present invention.

Referring to FIG. 17, according to one embodiment of the present invention, the step 136 of identifying the data that maximizes the composite function includes three substeps 171–173. First in step 171, an absolute maximum value of the composite function is determined. Next in step 172, a region about the absolute maximum value of the composite defined is defined. Finally in step 173, a trading price, a trading volume and a trading party are determined for each of the different securities so that a resulting value of the composite function lies within the region defined in step 172.

Figure 18:
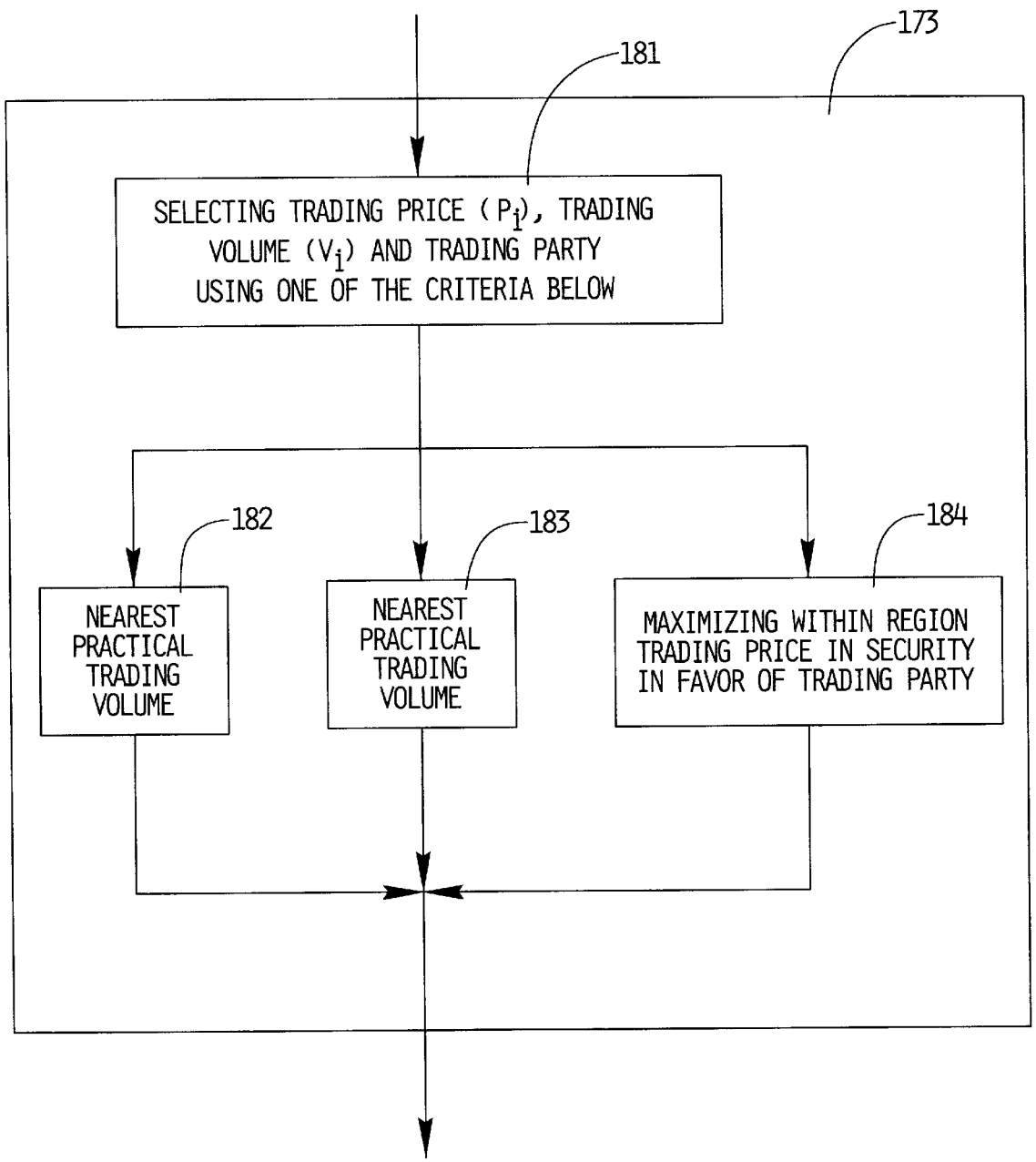
FIG. 18 depicts one exemplary embodiment of the sub-steps involved within the step of determining the data that causes the resulting value of the composite function to lie within the defined region shown in FIG. 17 according to the present invention.

Referring to FIG. 18, step 173 can be further defined a steps 181–184. In step 181, the trading data is selected using a predetermined criteria. Possible predetermined criteria are set forth in steps 182–184. One possible predetermined criteria includes a nearest trading volume (step 182). Another possible predetermined criteria includes a nearest practical trading price (step 183). Yet another possible predetermined criteria includes maximizing within the region a trading price in each of the different securities in favor of the trading parties (step 184).

Figure 22:
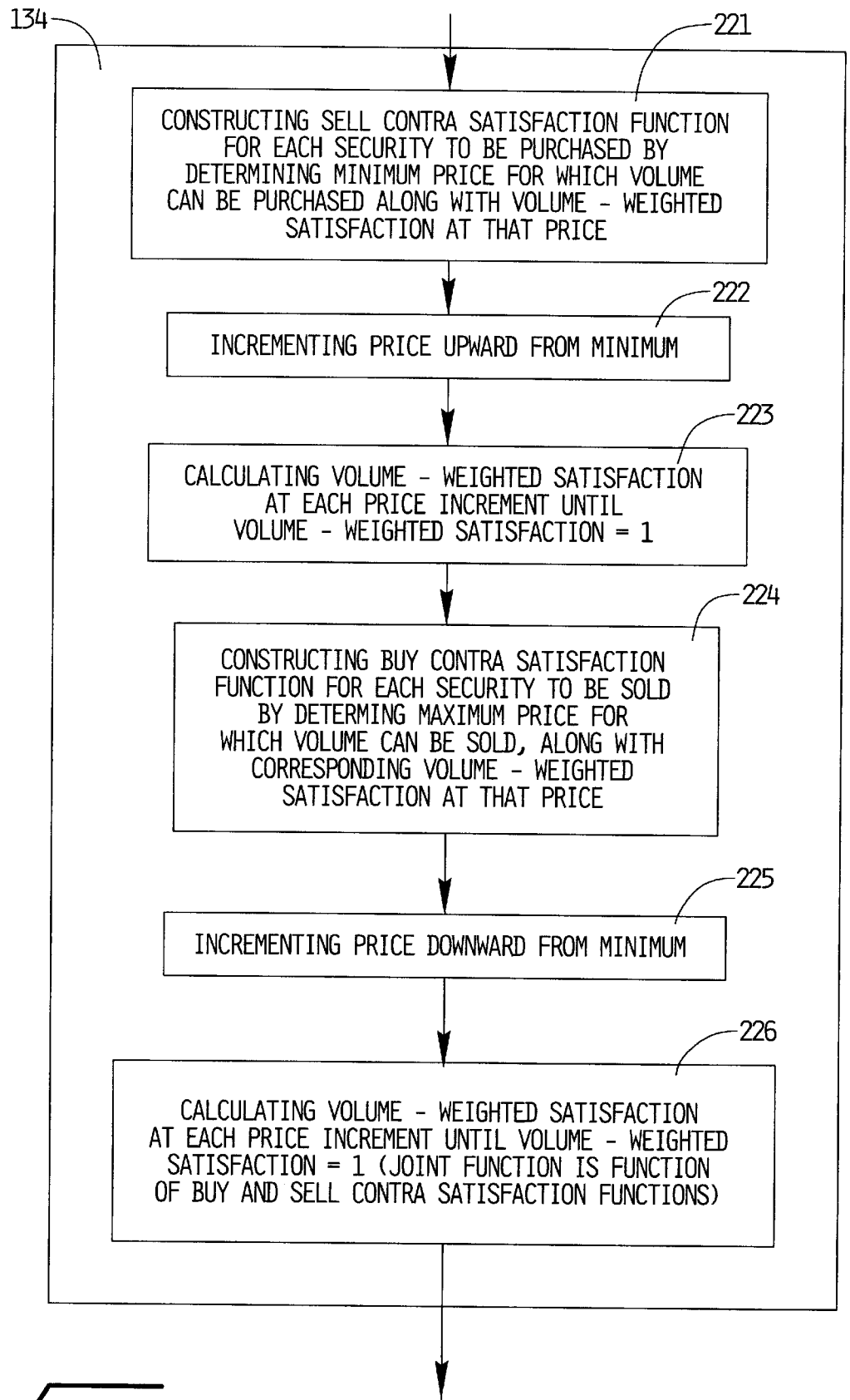
FIG. 22 depicts one exemplary set of additional steps to be performed in the case of insufficient liquidity in the exemplary embodiment of the method of the present invention depicted in FIG. 13.

Referring to FIG. 22, shown therein is an exemplary embodiment for performing the step 134 in the method shown in FIG. 13. In step 221, constructing a sell contra satisfaction function for each security to be purchased is constructed by determining a minimum price for which the volume can be purchased, along with a corresponding volume-weighted satisfaction at that price. Next in step 222, the price is incremented upward from the minimum price. In step 223, the volume-weighted satisfaction is calculated at each price increment until a volume-weighted satisfaction value of unity is obtained. In step 224, a buy contra satisfaction function is constructed for each security to be sold by determining a maximum price for which the volume can be sold, along with a corresponding volume-weighted satisfaction at that price. In step 225, the price is incremented downward from the maximum price. Finally, in step 226 the volume-weighted satisfaction is calculated at each price increment until a volume-weighted satisfaction value of unity is obtained. The resulting joint function is a function of each of the buy and sell contra satisfaction functions. Furthermore, the joint function is a product of the buy and sell contra side satisfaction functions. The buy and sell contra side satisfaction functions can also include limit orders.

Figure 23:
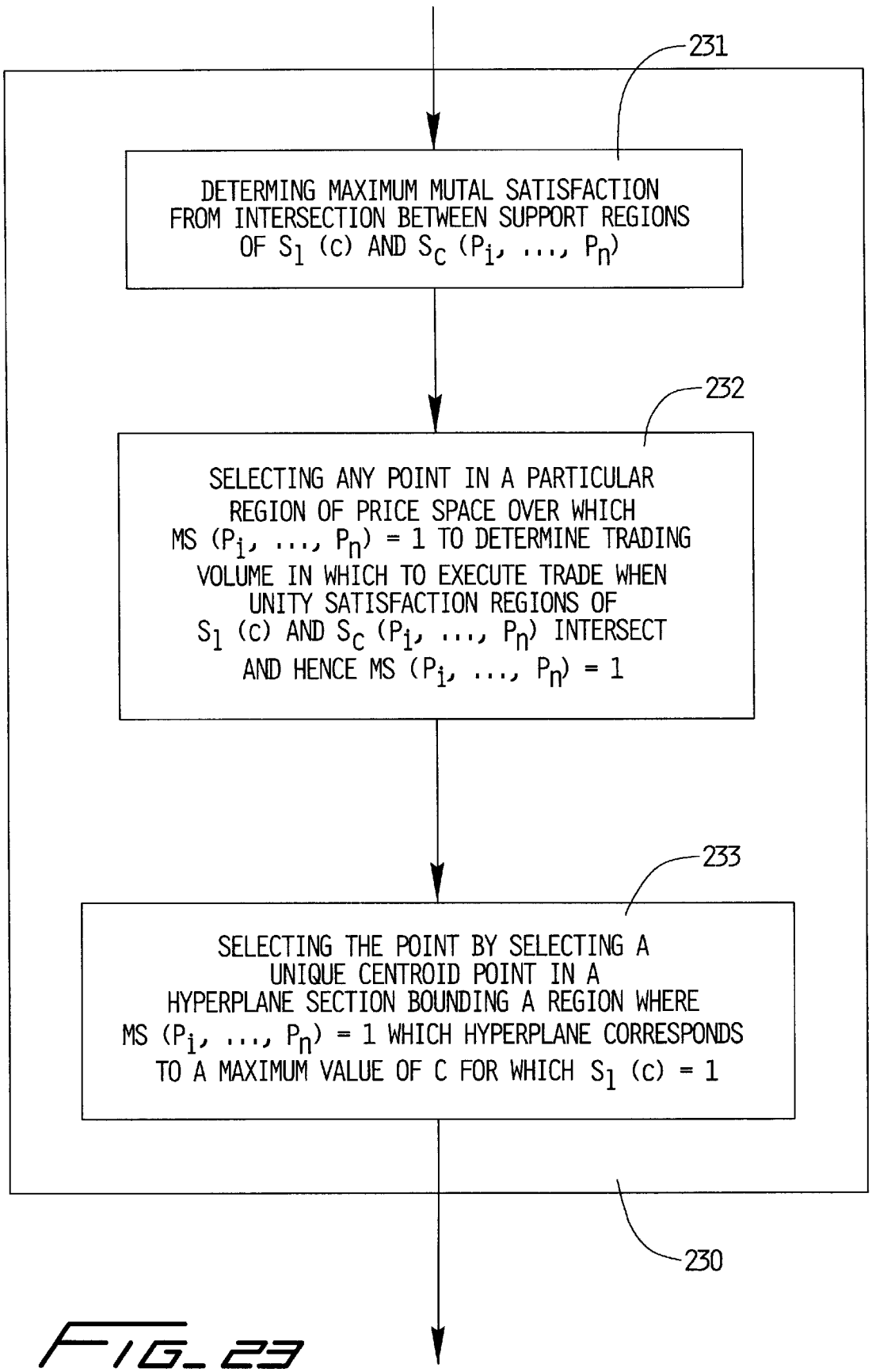
FIG. 23 depicts one exemplary embodiment of the sub-steps involved within the step of determining the data that maximizes the composite function shown in FIG. 13 according to the present invention.

As indicated in FIG. 13, the composite function is defined as:

$$MS(P_1, \ldots, P_N) = S_L(c) \cdot S_C(P_1, \ldots, P_N)$$

where c is a function of $P_i$, $V_i$, i=1 to N, and $S_L(c)$ is the first function and $S_C(P_1, \ldots, P_N)$ is the joint function. Referring now to FIG. 23, the maximum mutual satisfaction can be determined from an intersection between support regions of $S_L(c)$ and $S_C(P_1, \ldots, P_N)$ (step 231). In step 232, any point in a particular region of price space over which $MS(P_1, \ldots, P_N)$ is unity is selected to determine the trading price, trading parties and trading volume in which to execute the trade when unity satisfaction regions of $S_L(c)$ and $S_C(P_1, \ldots, P_N)$ intersect. In this case, the mutual satisfaction $MS(P_1, \ldots, P_N)$ is unity over the particular region of price space. In step 233, the point is selected by selecting a unique centroid point in a hyperplane section bounding a region of unity values of $MS(P_1, P_N)$, which hyperplane corresponds to a maximum value of c for which $S_L(c)$ has unity value, thereby yielding a most favorable price to each of the trading parties in the region of unity values of $MS(P_1, P_N)$.

Referring now to FIG. 24, shown therein are additional steps in case insufficient liquidity exists. In step 241, a minimum percentage of desired volume is determined that is available in any of the involved securities if adequate contra volume does not exist in one or more securities. In step 242, all volumes and the first and second functions are adjusted to reflect this downsized trade.

Referring to FIG. 25, shown therein is an alternative embodiment for additional steps in case insufficient liquidity exists. In step 251, a scaled-down version of the desired trade is executed on a pro-rata basis for each security and preserving the relative volume mix among the individual securities if adequate contra volume does not exist in one or more securities.

Referring to FIG. 26, shown therein is an alternative embodiment for additional steps in case insufficient liquidity exists. In step 261, a minimum volume available in each involved security is determined, not to exceed the desired volume if adequate contra volume does not exist in one or more securities. In step 262, those volumes are adjusted that are less than the desired volume, and the satisfaction functions $S_L(c)$ and $S_C(P_1, \ldots, P_N)$, to reflect the reduced trade.

Referring to FIG. 27, shown therein is an alternative embodiment for additional step in case insufficient liquidity exists. In step 271, an eclectic execution of the desired trade is performed, preserving as much of the original desired volume in each security as possible if adequate contra volume does not exist in one or more securities.

Referring to FIG. 28, shown therein is an alternative embodiment for additional steps in case insufficient liquidity exists. In step 281, the volume in securities where adequate liquidity is available is adjusted upward in order to keep the same $S_L(c)$, while adjusting $S_C(P_1, \ldots, P_N)$ to reflect the new volumes if adequate contra volume does not exist in one or more securities.

Referring to FIG. 29, shown therein is an alternative embodiment for an additional step in case insufficient liquidity exists. In step 291, a trade of similar overall net cost to the original desired trade is executed, but with a different mix of volumes of the requisite securities.

Referring to FIG. 30, shown therein are some alternative additional steps according to one exemplary embodiment of the method of the present invention. In step 301, a dedicated terminal is used to enter data when performing a linked trade. In step 302, a graphical user interface is provided via which the linked trader enters data regarding the linked trade. The graphical user interface includes a menu selection for selecting a linked trading profile entry, and the linked trading profile includes fields for each security a desired volume, a plurality of fields for entering the costs for the linked trade and each associated satisfaction.

Theory

We shall describe the theory behind the present invention in the context of securities trading. The same theory applies equally to the above described situation, and others (such as broadcast time trading, commodities trading, or any agreement where multiple parties and/or multiple terms are involved and the parties would rather not disclose their willingness to enter into the agreement on certain terms), however, the theory is significantly more abstract in these instances.

Assume a market participant ("linked trader") desires to execute a set of N linked trades involving the simultaneous purchase of $V_i$ units of k different securities, $X_i$, i=1 ... k, and sale of $V_i$ units of N–k different securities $X_i$, where i=k+1 ... N. Any indifferent set of price outcomes from this set of trades can be expressed as a hyperplane in N-dimensional price space:

$$\sum_{i=1}^{N} P_i V_i = c \qquad (1)$$

where $P_i$ is the price of security $X_i$, $V_i$ is positive for purchases and negative for sales, and c is the net cost of the trade. Positive values of c represent a net cash outflow from the composite trade, while negative values represent a net cash inflow.

In other words, the linked trader is merely interested in trading certain volumes of securities in a linked trade (i.e., all simultaneously) and does not care about the price obtained for each individual security, but only cares about the total cost of the transaction. Obviously, there is a definite relationship between the costs of the total transaction and the price of an individual security, but the satisfaction function is defined as a function of the cost of the overall transaction rather than the price in the individual securities, as in the prior patent application referenced above.

The linked trader therefore specifies each individual security he desires to trade and a volume associated with that security. Once all of the individual securities are specified, the linked trader then specifies a range of costs for the whole transaction (positive or negative depending whether it is a buy or sell overall) along with a degree of satisfaction for each cost within the range.

For example, Table 1 is indicative of the type of data entered by the linked trader. The table indicates the individual securities and the volume of each desired to be bought/sold.

TABLE 1

| Security ($X_i$) | Volume ($V_i$) |
| --- | --- |
| IBM | 500,000 |
| Xerox | –100,000 |
| Microsoft | 200,000 |
| Intel | 400,000 |
| AT&T | 1,000,000 |
| Lucent | –500,000 |
| Viacom | 1,000,000 |
| Citicorp | –200,000 |
| Conrail | –400,000 |

Continuing the theoretical discussion, the user desiring the linked trade can then define an associated scalar satisfaction function $S_L(c)$ for the composite linked trade, which always has the property that $S_L(c)$ equals unity for sufficiently small values of c (which may be negative in the case where net cash inflow is required, as in a sale) and, over some range of c values, transitions monotonically to zero as c increases. This satisfaction function expresses the degree of willingness to perform the prescribed set of linked trades, as a function of the net cost c.

Table 2 indicates the degree of satisfaction the linked trader would have in effecting the overall transaction; ranging from full satisfaction to pay $3.5 million, to unwillingness to pay $5.4 million or more.

TABLE 2

| Overall Cost ($M) | Cost ($M) |
| --- | --- |
| 3.5 | 1 |
| 3.9 | 0.9 |
| 4.2 | 0.75 |
| 4.5 | 0.5 |

TABLE 2-continued

| Overall Cost ($M) | Cost ($M) |
|---|---|
| 4.8 | 0.25 |
| 5.4 | 0 |

Two dimensional examples of $S_L(c)$ are shown in the contour plots of FIGS. 1–4, wherein the independent variables are $P_1$ (horizontal axis) and $P_2$ (vertical axis). These satisfaction profiles cover the four cases of buying $X_1$ and buying $X_2$, buying $X_1$ and selling $X_2$, selling $X_1$ and buying $X_2$, and selling $X_1$ and selling $X_2$, respectively, with each case involving the purchase or sale of one unit of $X_1$ and two units of $X_2$.

In FIG. 1, for example, region 5 indicates the region of prices where the trader would be fully satisfied to performed the linked trade. The diagonal lines (i.e., hyperplanes) indicate contour levels of intermediate satisfaction, which decreases approaching the black region. Along any of these diagonal lines, the net cost of the linked trade (and the corresponding satisfaction) is constant, and the trader is therefore indifferent to any price pair lying on a given diagonal line.

Region 1 indicates the region of prices where the trader would be unwilling to perform the linked trade. Moving in the direction of the arrow from region 1 to region 5, one passes through regions of increasing intermediate satisfaction. In other words, region 2 represents a region of price combinations in which the trader is at least somewhat satisfied to trade. Region 3 represents a region of price combinations where the trader is more satisfied than region 2, but less satisfied than region 4. Region 4 represents a region of price combinations where the trader is more satisfied than region 3 but less than completely satisfied, as in region 5. Finally, region 5 indicates the region of price combinations where the trader would be completely satisfied to trade.

The same is true for FIG. 2, however, the whole figure has been rotated clockwise ninety degrees from FIG. 1. In FIG. 2, for example, region 10 indicates the region of prices where the trader would be fully satisfied to performed the linked trade. Region 6 indicates the region of prices where the trader would be unwilling to perform the linked trade. Moving in the direction of the arrow from region 6 to region 10, one passes through regions of increasing intermediate satisfaction. In other words, region 7 represents a region of price combinations in which the trader is at least somewhat satisfied to trade. Region 8 represents a region of price combinations where the trader is more satisfied than region 7, but less satisfied than region 9. Region 9 represents a region of price combinations where the trader is more satisfied than region 8 but less than completely satisfied, as in region 10. Finally, region 10 indicates the region of price combinations where the trader would be completely satisfied to trade. As before, along any of these diagonal lines, the net cost of the linked trade (and the corresponding satisfaction) is constant, and therefore the trader is indifferent to any price pair lying on a given line.

As with the previous figure, FIG. 3 is similar to FIG. 1 but has been rotated ninety degrees counterclockwise from FIG. 1. In FIG. 3, for example, region 15 indicates the region of prices where the trader would be fully satisfied to performed the linked trade. Region 11 indicates the region of prices where the trader would be unwilling to perform the linked trade. Moving in the direction of the arrow from region 11 to region 15, one passes through regions of increasing intermediate satisfaction. In other words, region 12 represents a region of price combinations in which the trader is at least somewhat satisfied to trade. Region 13 represents a region of price combinations where the trader is more satisfied than region 12, but less satisfied than region 14. Region 14 represents a region of price combinations where the trader is more satisfied than region 13 but less than completely satisfied, as in region 15. Finally, region 15 indicates the region of price combinations where the trader would be completely satisfied to trade. As before, along any of these diagonal lines, the net cost of the linked trade (and the corresponding satisfaction) is constant, and therefore the trader is indifferent to any price pair lying on a given line.

Finally, FIG. 4 is similar to FIGS. 1–3, but has been rotated ninety degree counterclockwise from FIG. 3. In FIG. 3, for example, region 20 indicates the region of prices where the trader would be fully satisfied to performed the linked trade. Region 16 indicates the region of prices where the trader would be unwilling to perform the linked trade. Moving in the direction of the arrow from region 16 to region 20, one passes through regions of increasing intermediate satisfaction. In other words, region 17 represents a region of price combinations in which the trader is at least somewhat satisfied to trade. Region 18 represents a region of price combinations where the trader is more satisfied than region 17, but less satisfied than region 19. Region 19 represents a region of price combinations where the trader is more satisfied than region 18 but less than completely satisfied, as in region 20. Finally, region 20 indicates the region of price combinations where the trader would be completely satisfied to trade. As before, along any of these diagonal lines, the net cost of the linked trade (and the corresponding satisfaction) is constant, and therefore the trader is indifferent to any price pair lying on a given line. This same concept extends to an arbitrary number of dimensions, but cannot be depicted graphically beyond three dimensions.

Having posed the satisfaction function $S_L(c)$ for the linked trade, it remains to describe the joint contra satisfaction function $S_C(P_1, \ldots, P_N; V_1, \ldots, V_N)$, which is a 2N-dimensional function of price and volume in each of the N securities involved in the linked trade. For the moment, let us assume that adequate contra-side liquidity exists in all of these securities to enable the purchase and/or sale of the desired volume $V_i$ in each security. We shall address the situation when such liquidity does not exist later.

For security $X_i$, we can then construct a contra-side satisfaction function $S_{C_i}(P_i, V_i)$ by determining, for each price, the volume-weighted contra satisfaction to trade $V_i$ shares at that price. Given our assumption of adequate liquidity, this may be expressed as a scalar function of price alone, $S_{C_i}(P_i)$, for the implicit volume $V_i$ required for the linked trade.

For example, a sell contra satisfaction function may be constructed by determining the minimum price for which the volume $V_i$ can be purchased, along with the corresponding volume-weighted satisfaction at that price, and then incrementing the price upward, calculating volume-weighted satisfaction at each price increment until a volume-weighted satisfaction value of unity is obtained.

Under the assumption of adequate liquidity, the joint contra satisfaction function is then defined as the product of these individual satisfaction functions:

$$S_C(P_1, \ldots, P_N) = \prod_{i=1}^{N} S_{Ci}(P_i) \qquad (2)$$

This contra-side satisfaction function is defined over a "fuzzy hypercube" in N-dimensional price space, in the sense that contours of constant satisfaction, which is a fuzzy variable, correspond to nested hypercubes, with rounded corners at intermediate satisfaction values, lying in the positive quadrant of $R_N$. Again employing the two-dimensional cases used in FIGS. 1–4 for illustration, we show contour plots of corresponding contra-side satisfaction functions $S_L(c)$ in FIGS. 5–8, respectively.

For example, in FIG. 5, the region 27 indicates the region of prices where the contra side sellers jointly have unity satisfaction (i.e., are completely satisfied) to trade at any pair of prices within this region. The contour lines stepping down to region 22 indicate intermediate levels of joint satisfaction. The traders would be less satisfied to trade at prices in region 26 than region 27, but more satisfied than in region 25. The same is true for regions 24 and 23. Region 22 represents the region where no sellers would be willing to trade.

In the degenerate case, where all the individual contra side satisfaction functions are step functions that transition abruptly from unity to zero (i.e., corresponding to regular limit orders) the joint contra satisfaction function is unity over the interior of a single hypercube and zero elsewhere. In this case, with reference to FIGS. 5–8, there would be an abrupt transition from the black region to farthest most white region without any transition regions.

In FIG. 6, the region 28 indicates the region of prices where the contra side buyers/sellers jointly have unity satisfaction (i.e., are completely satisfied ) to trade at any pair of prices within this region. The contour lines stepping down to region 33 indicate intermediate levels of joint satisfaction. In other words, the traders would be less satisfied to trade at prices in region 29 than region 28, but more satisfied than in region 30. The same is true for regions 31 and 32. Region 33 represents the region where the contra side would be unwilling to trade.

In FIG. 7, region 34 indicates the region of prices where the contra side buyers/sellers jointly have unity satisfaction (i.e., are completely satisfied ) to trade at any pair of prices within this region. The contour lines stepping down to region 39 indicate intermediate levels of joint satisfaction. In other words, the traders would be less satisfied to trade at prices in region 35 than region 34, but more satisfied than in region 36. The same is true for regions 37 and 38. Region 39 represents the region where the contra side would be unwilling to trade.

In FIG. 8, the region 45 indicates the region of prices where the contra side buyers jointly have unity satisfaction (i.e., are completely satisfied ) to trade at any pair of prices within this region. The contour lines stepping down to region 40 indicate intermediate levels of joint satisfaction. In other words, the traders would be less satisfied to trade at prices in region 44 than region 45, but more satisfied than in region 43. The same is true for regions 42 and 41. Region 40 represents the region where the contra side would be unwilling to trade.

Note by comparison between corresponding cases (e.g., FIG. 1 versus FIG. 5, etc.) that the support region of $S_L(c)$, i.e., the region of price values where the linked-trade satisfaction function has non-zero values, lies opposite, and potentially intersects, the interior vertex of the fuzzy hypercube.(i.e., corner) of the support regions of the corresponding contra-side satisfaction function $S_C(P_1, \ldots, P_N)$. When these regions intersect, the hyperplane contours of $S_L(c)$ literally slice the corner of the fuzzy hypercube support region of $S_C(P_1, \ldots, P_N)$. This feature generalizes to the N-dimensional case as well, although it cannot be visualized beyond three dimensions.

As an illustration, FIG. 9 shows the mutual satisfaction support region resulting from the product of $S_L(P_1, P_2)$ in FIG. 1 and $S_C(P_1, P_2)$ in FIG. 5, although only three regions for each are depicted for simplicity sake. The highest mutual satisfaction occurs in region 55, where the regions of complete satisfaction overlap, i.e., regions 5 (FIG. 1) and 27 (FIG. 5). Next, region 54 represents a lower value of mutual satisfaction, as it is the intersection of region 27 (FIG. 5) with region 4 (FIG. 1). Region 52 represents the overlap of regions 26 (FIG. 5) and region 5 (FIG. 1). As one moves farther away from region 55, the mutual satisfaction decreases. The arrows in FIG. 9 represent gradients of decreasing mutual satisfaction. Thus, region 49 has higher mutual satisfaction than region 48 and region 47, etc. The price coordinates of the region 55 indicate the optimum set of prices for this two-security linked trade.

Returning to the theory, the problem now reduces to finding the optimum price point in N-dimensional price space that results in the maximum mutual satisfaction $MS(P_1, \ldots, P_N)$, as defined by $$MS(P_1, \ldots, P_N) = S_L(c) \cdot S_C(P_1, \ldots, P_N) \qquad (3)$$

where c is a function of $P_i$, $V_i$, i=1 . . . N as defined in equation (1).

Optimization Approach

Since none of the $V_i$ in equation (1) are zero, it is straightforward to show that satisfaction contours of $S_L(c)$ are not parallel to any axis in N-dimensional price space, and thus are not parallel to any side of the $S_C(P_1, \ldots, P_N)$ hypercube support region. Thus, the negative gradient of $S_L(c)$ with respect to c along any hypercube contour where $0<S_L(c)<1$ is a vector that points to the interior of the support region of $S_C(P_1, \ldots, P_N)$, i.e., decreasing values of $S_L(c)$ yield increasing (or at least non-decreasing) values of $S_C(P_1, \ldots, P_N)$.

We first consider the category of cases where the intersection between the support regions of $S_L(c)$ and $S_C(P_1, \ldots, P_N)$ is such that the values of either $S_L(c)$ or $S_C(P_1, \ldots, P_N)$ (or both) are strictly less than unity over the region of intersection, yielding $MS(P_1, \ldots, P_N)$ values less than unity in (3). The implication of the gradient geometry is that the optimum mutual satisfaction will occur at a point of tangency between a hyperplane contour of $S_L(c)$ and a convex satisfaction contour of $S_C(P_1, \ldots, P_N)$, since the point of tangency achieves the maximum value of $S_C(P_1, \ldots, P_N)$ for a given value of $S_L(c)$.

Since the individual contra-side satisfaction functions $S_{Ci}(P_i)$ in equation (2) are strictly monotonic over their respective regions of transition from unity to zero values, the locus of the points of tangency between hyperplane contours of $S_L(c)$ and satisfaction contours of $S_C(P_1, \ldots, P_N)$ traces out a one-dimensional curvilinear segment $\Psi$ in N-dimensional price space. One end of the segment $\Psi$ is the point of tangency corresponding to the zero satisfaction boundary of $S_L(c)$, if $S_C(P_1, \ldots, P_N)<1$ at this point, or to the hypercube vertex point corresponding to the unity satisfaction boundary contour of $S_C(P_1, \ldots, P_N)$ otherwise. The other end of the segment $\Psi$ is the point of tangency corresponding to the unity satisfaction boundary contour of $S_L(c)$, if $S_C(P_1, \ldots, P_N) > 0$ at this point, or to the hypercube vertex point corresponding to the zero satisfaction boundary contour of $S_C(P_1, \ldots, P_N)$ otherwise.

Along this segment $\Psi$, the values of $S_C(P_1, \ldots, P_N)$ decrease strictly monotonically from the former endpoint to the latter, due to the strict monotonicity of the $S_{Ci}(P_i)$ functions. Conversely, the values of $S_L(c)$ decrease strictly monotonically proceeding from the latter endpoint of $\Psi$ to the former. Thus there exists at least one optimum solution $(\hat{P}_1, \ldots, \hat{P}_N)$ that maximizes $MS(P_1, \ldots, P_N)$ at some point along $\Psi$, which can be determined via a one-dimensional search along the segment $\Psi$. As an illustration, FIG. 10 shows the mutual satisfaction surface resulting from the product of $S_L(P_1, P_2)$ in FIG. 1 and $S_C(P_1, P_2)$ in FIG. 5, although only three regions for each are depicted for simplicity sake. The segment $\Psi$ is shown. The maximum mutual satisfaction occurs somewhere on this line segment as discussed above. The price coordinates of the peak indicate the optimum set of prices for this two-security linked trade.

We now describe a constructive method for evaluating $MS(P_1, \ldots, P_N)$ along the segment $\Psi$, and thereby determining the optimum set of prices that maximizes $MS(P_1, \ldots, P_N)$. Let $\vec{P}_{C0} = (P_1^{(0)}, \ldots, P_N^{(0)})$ be the set boundary prices at which the respective individual $S_{Ci}(P_i)$ satisfaction functions just attain their zero values, and let $\vec{P}_{C1} = (P_1^{(1)}, \ldots, P_N^{(1)})$ be the set of boundary prices at which the individual $S_{Ci}(P_i)$ satisfaction functions just attain their unity values. Let $\vec{P}_{L0}$ be the point of tangency corresponding to the intersection of the zero satisfaction boundary hyperplane of $S_L(c)$ with a $0 < S_C(P_1, \ldots, P_N) < 1$ contour of $S_C(P_1, \ldots, P_N)$, where such exists, and let $\vec{P}_{L1}$ be the point of tangency corresponding to the intersection of the unity satisfaction boundary hyperplane of $S_L(c)$ with a $0 < S_C(P_1, \ldots, P_N) < 1$ contour of $S_C(P_1, \ldots, P_N)$, where such exists. Thus the endpoints of the segment $\Psi$ are given by $$\Psi_0 = \vec{P}_0 \text{ if } S_L(\vec{P}_0) < 1, \text{ or } \Psi_0 = \vec{P}_{L1} \text{ otherwise; and} \quad (4)$$

$$\Psi_1 = \vec{P}_1 \text{ if } S_L(\vec{P}_1) > 0, \text{ or } \Psi_1 = \vec{P}_{L0} \text{ otherwise} \quad (5)$$

respectively.

The task now is to evaluate $MS(P_1, \ldots, P_N)$ at points along the segment $\Psi$ to determine the set of prices $(\hat{P}_1, \ldots, \hat{P}_N)$ that maximize this quantity. In certain mathematically tractable cases of the functions $S_L(c)$ and $S_C(P_1, \ldots, P_N)$, a rigorous optimization may be performed using the calculus of variations. In other instances, a number of standard numerical optimization approaches may be used.

For the latter cases, interior points of the segment $\Psi$ may be determined by finding, for any value of c whose corresponding hyperplane satisfaction contour of $S_L(c)$ defined by (1) lies between the points $\Psi_0$ and $\Psi_1$, the point of tangency $\vec{P}_\Psi(c)$ (in N-dimensional price space) between that hyperplane contour and its corresponding satisfaction contour of $S_C(P_1, \ldots, P_N)$. As described previously, this is equivalent to finding, for the given value of c, the unique set of prices (constrained by (1)) that maximize $S_C(P_1, \ldots, P_N)$ and thus maximize $MS(P_1, \ldots, P_N)$ (the product of $S_L(c)$ and $S_C(P_1, \ldots, P_N)$) for that value of c. This calculation may be performed for incremental values of c lying between those values corresponding to the endpoints of the segment $\Psi$, and the optimum $\vec{P}_\Psi(c)$ is selected that results in the maximum value of $MS(P_1, \ldots, P_N)$.

In practice, satisfaction values of the individual $S_{Ci}(P_i)$ functions typically are specified at discrete price points (e.g., multiples of eighths of a dollar), and each $S_{Ci}(P_i)$ function is assumed to be continuous and strictly monotonic with respect to its respective price variable $P_i$ between these points. The same holds true for the linked trade satisfaction function $S_L(c)$. In between these points of specification of these functions, we assume the satisfaction functions are piecewise linear. For each $S_{Ci}(P_i)$, let $\{P_{i,j}, j=0 \ldots K_i\}$ be the set of discrete price points at which $S_{Ci}(P_i)$ is defined for values of satisfaction $S_{i,j}$ between zero and unity, viz., $$S_{Ci}(P_{i,j}) = S_{i,j}, \quad (6)$$

where $$S_{i,0} = 0 \text{ at } P_{i,0} = \vec{P}_i^{(0)} \text{ and } S_{i,K_i} = 1 \text{ at } P_{i,K_i} = \vec{P}_i^{(1)}. \quad (7)$$

Note that by this definition, if $S_{Ci}(P_i)$ corresponds to a buyer satisfaction function, then the values of $P_{i,j}$ decrease with increasing values of the index j, and vice versa if $S_{Ci}(P_i)$ corresponds to a seller satisfaction function. In this fashion, $S_{Ci}(P_i)$ always increases strictly monotonically with increasing values of the index j. Similarly, let $\{(c_k, k=0 \ldots K_0\}$ be the set of discrete values of net cost at which $S_L(c)$ is defined, viz., $$S_L(c_k) = S_{L,k}, \text{ where } S_{L,0} = 0 \text{ at } c_0 \text{ and } S_{L,K_0} = 1 \text{ at } c_{K_0}. \quad (8)$$

Assuming piecewise linearity of the individual satisfaction functions $S_{Ci}(P_i)$ and the linked satisfaction function $S_L(c)$ between their specified values above, we can then write:

$$S_{Ci}(P_i) = r_{i,j}(P_i - P_{i,j}) + S_{i,j};$$

$$P_{i,j} \leq P_i \leq P_{i,j+1}, \quad (9)$$

$$j = 0 \ldots K_i - 1,$$

where $$r_{i,j} = \frac{S_{i,j+1} - S_{i,j}}{P_{i,j+1} - P_{i,j}}, \quad j = 0 \ldots K_i - 1 \quad (10)$$

and similarly for $S_L(c)$:

$$S_L(c) = s_k(c - c_k) + S_{L,k};$$

$$c_k \leq c \leq c_{k+1}, \quad (11)$$

$$k = 0 \ldots K_0 - 1$$

where $$s_k = \frac{S_{L,k+1} - S_{L,k}}{c_{k+1} - c_k} \quad (12)$$

$$k = 0 \ldots K_0 - 1$$

Outside the price and/or net cost ranges defined above, the satisfaction functions take on unity or zero values, as appropriate.

With the above construction, we can use standard numerical optimization techniques to perform an exhaustive evaluation of $MS(P_{,b}, \ldots, P_N)$ over all $c_k$ typically involving, at most, a few dozen values) to determine the optimum prices $(\hat{P}_1, \ldots, \hat{P}_N)$, which amounts to a very modest computational burden.

In the event of multiple optima along the segment $\Psi$, generally accepted notions of fair trading practice would give price improvement to the contra-side participants (since the linked trade represents a contingent order and thus has lower priority or standing with respect to non-contingent orders) and thus we would select the optimum price corresponding to the maximum value of c. However, this rule can be modified to suit individual market conventions.

In the second category of cases, where the unity satisfaction regions of $S_L(c)$ and $S_C(P_1, \ldots, P_N)$ intersect, the mutual satisfaction $MS(P_1, \ldots, P_N)$ is unity over some region of price space. While any point in this region of price values over which $MS(P_1, \ldots, P_N)$ is unity could be chosen to execute the linked trade, generally accepted principles of fairness would again suggest that price improvement should be evenly distributed among the contra-side participants.

This can be achieved by selecting the unique centroid point in the hyperplane section bounding the region of unity values of $MS(P_1, \ldots, P_N)$, which hyperplane corresponds to the maximum value of c for which $S_L(c)$ has unity value, thus yielding the most favorable prices to the contra-side parties in the region of unity values of $MS(P_1, \ldots, P_N)$. For the two dimensional case as in the continuing example, one can see this in FIG. 9, where the region 55 contains unity values of $MS(P_1, \ldots, P_N)$. The centroid of region 55 is the point yielding the most favorable prices to the contra-side parties. This hyperplane is defined by $$\sum_{i=1}^{N} P_i V_i = c_1 \qquad (13)$$

where $c_1$ is the maximum value of c in equation (1) for which $S_L(c)$ has unity value. The vertices $v_i$ of the hyperplane section bounding the region of unity values of $MS(P_1, \ldots, P_N)$ are the points of intersection of (13) with the N unity-satisfaction contour line segments of $S_C(P_1, \ldots, P_N)$, given by the equations $$P_j = \vec{P}_j^{(1)}; j \neq i,$$

$$P_i \geq \vec{P}_i^{(1)} \text{ if } V_i > 0, \text{ or} \qquad (14)$$

$$0 \leq P_i \leq \vec{P}_i^{(1)} \text{ if } V_i < 0; i = 1 \ldots N$$

The coordinates of the vertices $v_i$ thus satisfy the equations $$\sum_{\substack{j=1 \\ j \neq i}}^{N} \vec{P}_j^{(1)} V_j + P_i V_i = c_1, i = 1 \ldots N, \qquad (15)$$

from which we can solve for the $P_i$ coordinate of the ith vertex $v_i$:

$$P_i = \frac{1}{V_i} \left[ c_1 - \sum_{\substack{j=1 \\ j \neq i}}^{N} \vec{P}_j^{(1)} V_j \right] \qquad (16)$$

Thus the set of vertices of the hyperplane section bounding the region of unity values of $MS(P_1, \ldots, P_N)$ is expressed by:

$$v_i = [\vec{P}_1^{(1)} \ldots P_i \ldots \vec{P}_N^{(1)}], i = 1 \ldots N \qquad (17)$$

i.e., the ith coordinate of the ith vertex is $P_i$ as determined by (16) and the jth coordinates of the ith vertex for $j \neq i$ are equal to $\vec{P}_j^{(1)}$, the coordinates of the unity-satisfaction boundary interior vertex of $S_C(P_1, \ldots, P_N)$. The optimum centroid point $\hat{P}_C$ of the hyperplane section is simply the arithmetic average of the vertices in (17), viz., $$\hat{P}_C = \frac{1}{N} \sum_{i=1}^{N} v_i, \qquad (18)$$

which can be shown by substitution to lie on the hyperplane defined by (14).

SUMMARY

Thus we have constructed a feasible computational procedure for finding the optimum set of prices to execute the linked trade in all cases of intersection between $S_L(c)$ and $S_C(P_1, \ldots, P_N)$, which maximizes the joint mutual satisfaction as defined by (3).

In the above, we assumed adequate liquidity to provide the required volume in each security involved in the linked trade. There may be instances where adequate contra volume does not exist in one or more securities. Such cases may be handled by a number of strategies, including:

Determine the minimum percentage of desired volume that is available in any of the involved securities. Adjust all volumes, and the satisfaction functions $S_L(c)$ and $S_C(P_1, \ldots, P_N)$, to reflect this downsized trade. This option amounts to executing a scaled-down version of the desired trade on a pro-rata basis for each security, preserving the relative volume mix among the individual securities.

Determine the minimum volume available in each involved security, not to exceed the desired volume. Adjust those volumes that are less than the desired volume, and the satisfaction functions $S_L(c)$ and $S_C(P_1, \ldots, P_N)$, to reflect the reduced trade. This option amounts to an eclectic execution of the desired trade, preserving as much of the original desired volume in each security as possible.

Using the above eclectic approach, adjust upward the volume in securities where adequate liquidity is available in order to keep the same $S_L(c)$, while adjusting $S_C(P_1, \ldots, P_N)$ to reflect the new volumes. This option amounts to executing a trade of similar overall net cost to the original desired trade, but with a different mix of volumes of the requisite securities.

It will be apparent that numerous other strategies may be considered for dealing with cases of inadequate liquidity, all of them falling within the scope of the basic invention.

Entry of the Linked Trade

The party desiring to perform a linked trade can access the system using a specially designated terminal or the same trading terminal with a menu selection or selecting a linked trading profile entry. The linked trading profile includes fields for each security and the desired volume. Once all of the securities have been entered, the screen includes a series of fields for entering the costs for the linked trade and each associated satisfaction. Price is not entered for the individual securities as the costs for the overall linked trade essentially accounts for price in the individual securities.

System

Referring to FIG. 11, the system 60 to implement the present invention includes a central matching controller 61, i.e., a computer, such as an IBM RS6000/SP, a plurality of trader terminals 62–67 (e.g., PC based workstations), and a linked trader terminal 68. While only one linked trader terminal 68 is shown, the system could employ a large number of these terminals, and in fact, these terminals can be identical to the trader terminals for individual securities markets. During each transaction, however, only one linked trade can be processed at a time. Thus, the linked trades will be processed according to a priority, such as first in time.

The traders $A_1$ through $A_n$ represent traders in one market, traders $B_1$ through $B_m$ represent traders in another market, and traders $Z_1$ through $Z_k$ represent traders in yet another market. A large number of markets could be represented within the system of the present invention, thus enabling transactions in a variety of securities, commodities and equities. For example, traders $A_1$ through $A_1$ could represent traders from the Pacific Exchange, while traders $B_1$ through $B_m$ represent traders in the foreign currency market in London, and traders $Z_1$ through $Z_k$ could represent traders in the commodities market in Tokyo. Optionally, each trader terminal could have the capability for performing linked trades by selecting an option from a menu of choices.

A central database stores all of the information received from the traders for later processing by the control engine. A database extraction routine can be used to extract certain types of information. For example, some traders may enter information regarding specific securities that are not being traded by any other traders, hence this data may not be needed for some of the calculations. In this case, the extraction routine may only extract data regarding securities that are part of the linked trade.

This extraction routine operates under control of the main control engine, which ultimately receives all of the data from the plurality of trader terminals and performs the necessary calculations discussed above. Once the identities of all of the parties and the prices and the volumes have all been determined, the control engine then executes the trade in each of the relevant markets, and informs the parties of the results of the trades. Clearing is performed in accordance with known rules and regulations.

In the above system, the workstations can be any type of user terminal, from the low power end to the high power end. For example, the workstation could simply be a dumb terminal that is operated by the central control engine, or a high performance workstation, such as a Sun workstation, or a RISC-based workstation, or the latest version of a personal computer. In addition, the workstation can employ any of the following operating systems: UNIX, DOS, Windows-95, and Macintosh.

According to the present invention, a system 140 for automatically trading linked securities is depicted in FIG. 14. The system 140 includes a linked trading workstation 145, a plurality of trading workstations 146–148 and a central control engine 141. The linked trading workstation 145 is designed such that a linked trader can input a satisfaction density profile that defines its degree of satisfaction to trade different securities simultaneously based on the overall cost of the transaction. The plurality of trader workstations 146–148 are designed such that individual securities traders can enter a satisfaction density profile that indicates their degree of satisfaction to trade particular securities as a function of price/volume. The central control engine 141 then determines a satisfaction density function for each of the individual securities based on the input of the traders. The central control engine 141 also determines a joint satisfaction function for all of the different securities from the individual satisfaction density functions. In addition, the central control engine 141 determines a mutual satisfaction function from the joint satisfaction function and the satisfaction density profile entered by the linked trader. Furthermore, the central control engine 141 maximizes the mutual satisfaction function, which establishes a set of prices, volumes and parties for trading each of the individual securities. Finally, the central control engine 141 transmits the set of prices, volumes and parties for trading each of the individual securities to trade execution 143 for executing simultaneously a trade among the identified parties for the different securities at the established prices and volumes. The system 140 also includes a central database 149 coupled to the plurality of trader workstations 146–148, the linked trader workstation 145 and the central control engine 141, and stores input from each of the traders regarding a degree of satisfaction of each of the traders to take a position in different securities as a function of price. Moreover, the system 140 includes an extraction routine 142 operating under control of the central control engine 141 and extracting from information stored in the database 149 the degrees of satisfaction of the traders to take a position opposite to the linked trader in each of the different securities.

According to the present invention, a system 150 for automatically determining a set of terms of an agreement between a first party and at least one other party is depicted in FIG. 15. The system 150 includes a user terminal 156 for mapping input from the first party regarding the terms in the agreement into a first function expressing a degree of satisfaction of the first party to agree to the terms over a range of decision variables. Also included in the system are a plurality of user terminals 157–159 and a database collecting input from at least one other party entered via the plurality of terminals 157–159 regarding the degree of satisfaction of the at least one other party to enter into the agreement with the first party on the terms. In addition, the system includes a processor mapping the input into a second function expressing the degree of satisfaction of the at least one other party to agree to the terms as a function of decision variables in each of the terms, determining a composite function of the first function and the second function, wherein the composite function represents a mutual degree of satisfaction between the first party and the at least one other party to agree to the plurality of terms, and determining a set of terms and decision variables for the agreement from a maximum of the composite function.

Referring to FIG. 31, an apparatus for determining trading parties, trading prices and trading volumes for performing simultaneous trading of different securities includes a graphical user interface 311, a processor 313, a database 314, an extraction routine 312 and a trade execution system 315. The graphical user interface 311 maps data from a linked trader regarding a simultaneous trade of multiple different securities as a group into a first function expressing degrees of satisfaction of the linked trader to trade the different securities simultaneously as a group over a desired range of costs. The central database 314 collects input from traders regarding a degree of satisfaction of each of the traders to take a position opposite to the linked trader in at least one of the different securities as a function of price. The processor 313 determines from the input of the traders a joint function expressing a joint degree of satisfaction by one or more second parties among the traders to take an opposite position in all of the different securities as a function of price in each of the different securities, and determines a composite function of the first function and the joint function. The composite function represents a mutual degree of satisfaction to execute a trade of the different securities between the linked trader and the one or more second parties. The processor 313 identifies for each of the different securities a trading price, a trading volume and a trading party among the one or more second parties that maximizes the composite function. The trade execution system simultaneously executes a trade with the linked trader and the trading parties in the different securities at the trading prices and the trading volumes identified by the processor 313. The extraction routine 312 extracts information from the database under control of the processor. The database 314 collects and stores information from the traders regarding the degrees of satisfaction of the traders to take either position in the different securities. The extraction routine 312 selects from the information collected by the database 314 the input regarding the degrees of satisfaction of the traders to take a position opposite to the linked party in each of the different securities.

Figure 32:
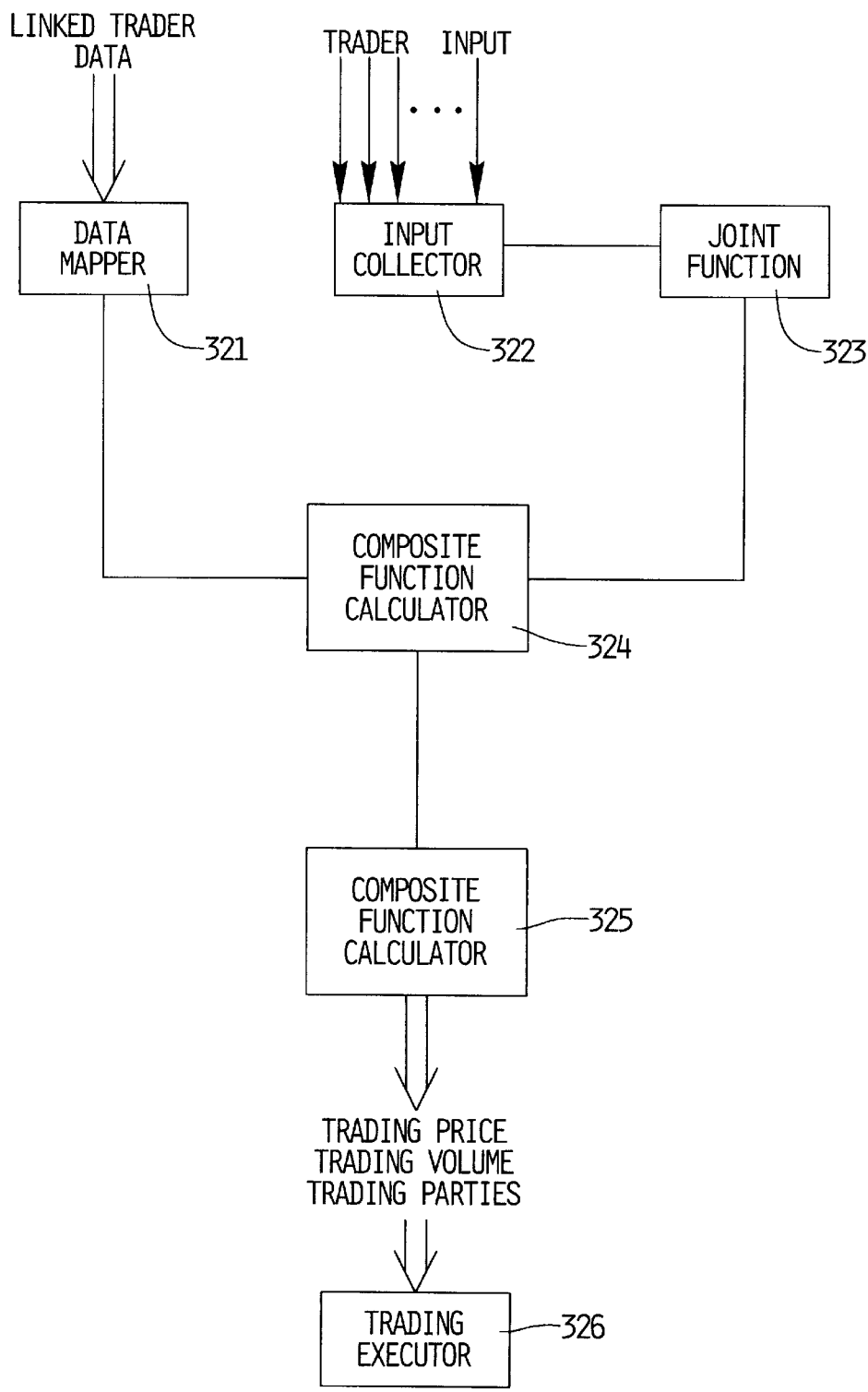
FIG. 32 depicts another exemplary embodiment of an apparatus according to the present invention.

FIG. 32 depicts another exemplary embodiment of an apparatus according to the present invention. Shown therein is a device 320 for determining trading parties, trading prices and trading volumes for simultaneous trading of different securities. The device 320 includes a data mapper 321, an input collector 322, a joint function calculator 323, a composite function calculator 324, a composite function maximizer 325 and a trade executor 326. The data mapper 321 maps data from a linked trader regarding a simultaneous trade of different securities as a group into a first function expressing degrees of satisfaction of the linked trader to trade the different securities simultaneously as a group over a desired range of costs. The input collected 322 collects input from traders regarding a degree of satisfaction of each of the traders to take a position opposite to the linked trader in at least one of the different securities as a function of price. The joint function calculator determines from the input of the traders a joint function expressing a joint degree of satisfaction by one or more second parties among the traders to take an opposite position in all of the different securities as a function of price in each of the different securities. The composite function calculator 324 determines a composite function of the first function and the joint function. The composite function represents a mutual degree of satisfaction to execute a trade of the different securities between the linked trader and the one or more second parties. The composite function maximizer identifies for each of the different securities a trading price, a trading volume and a trading party among the one or more second parties that maximizes the composite function. The trader executor executes simultaneously with the linked trader and the trading parties a trade in the different securities at the trading prices and the trading volumes identified by the composite function maximizer.

Referring to FIG. 33, the input collector 322 is shown in more detail. The input collector 322 includes an input collector 331 for collecting information from the traders regarding the degrees of satisfaction of the traders to take either position in the different securities. Furthermore, the input collector 322 includes a selector for selecting from the information collected by the input collector 331, the input regarding the degrees of satisfaction of the traders to take a position opposite to the linked trader in each of the different securities.

Referring to FIG. 34, the composite function maximizer 325 is shown in more detail. The composite function maximizer 325 includes an absolute maximum calculator 341 for determining an absolute maximum value of the composite function, a region definer 342 for defining a region about the absolute maximum value of the composite function, and a trade determiner for determining a trading price, a trading volume and a trading party for each security of the different securities so that a resulting value of the composite function lies within the defined region.

What is claimed is:

1. A method for determining trading parties, trading prices and trading volumes for simultaneous trading of a plurality of different securities, comprising the steps of:
   a) mapping data from a first party regarding a simultaneous trade of a plurality of different securities as a group into a first function expressing degrees of satisfaction of the first party to trade the plurality of different securities simultaneously as a group over a desired range of costs;
   b) collecting in a central database input from a plurality of traders regarding a degree of satisfaction of each of the plurality of traders to take a position opposite to the first party in at least one of the plurality of different securities as a function of price;
   c) determining from the input of the plurality of traders a joint function expressing a joint degree of satisfaction by one or more second parties among the plurality of traders to take an opposite position in all of the plurality of different securities as a function of price in each of the plurality of different securities;
   d) determining a composite function of the first function and the joint function, wherein the composite function represents a mutual degree of satisfaction to execute a trade in all of the plurality of different securities between the first party and the one or more second parties; and
   e) identifying for each of the plurality of different securities a trading price, a trading volume and a trading party among the one or more second parties that maximizes the composite function.

2. The method according to claim 1, wherein the step b) of collecting further comprises the steps of:
   (i) collecting information from the plurality of traders regarding the degrees of satisfaction of the each of the plurality of traders to take either position in the plurality of different securities; and
   (ii) selecting from the information collected in step b)(i) the input regarding the degrees of satisfaction of the plurality of traders to take a position opposite to the first party in each of the plurality of different securities.

3. The method according to claim 1, further comprising the steps of:
   f) determining a minimum percentage of desired volume that is available in any of the involved securities if adequate contra volume does not exist in one or more securities; and
   g) adjusting all volumes, and the first function and the second functions to reflect this downsized trade.

4. The method according to claim 1, further comprising the step of:
   f) executing a scaled-down version of the desired trade on a pro-rata basis for each security and preserving the relative volume mix among the individual securities if adequate contra volume does not exist in one or more securities.

5. The method according to claim 1, further comprising the steps of:
   f) determining a minimum volume available in each involved security, not to exceed the desired volume if adequate contra volume does not exist in one or more securities; and
   g) adjusting those volumes that are less than the desired volume, and the satisfaction functions $S_L(c)$ and $S_C(P_1, \ldots, P_N)$ to reflect the reduced trade.

6. The method according to claim 1, further comprising the step of:
   f) performing an eclectic execution of the desired trade, preserving as much of the original desired volume in each security as possible if adequate contra volume does not exist in one or more securities.

7. The method according to claim 1, further comprising the step of:
   f) adjusting upward the volume in securities where adequate liquidity is available in order to keep the same $S_L(c)$, while adjusting $S_C(P_1, \ldots P_N)$ to reflect the new volumes if adequate contra volume does not exist in one or more securities.

8. The method according to claim 1, further comprising the step of:
   f) executing a trade of similar overall net cost to the original desired trade, but with a different mix of volumes of the requisite securities.

9. The method according to claim 1, further comprising the steps of:
   f) using a dedicated terminal to enter data when performing a linked trade; and
   g) providing a graphical user interface via which the first party enters data regarding the linked trade, said graphical user interface includes a menu selection for selecting a linked trading profile entry, and the linked trading profile includes fields for each security a desired volume, a plurality of fields for entering the costs for the linked trade and each associated satisfaction.

10. The method according to claim 1, further comprising the step of:
    f) executing simultaneously with the first party and the trading parties a trade in the plurality of different securities at the trading prices and the trading volumes identified in step e).

11. The method according to claim 10, wherein the step b) of collecting further comprises the steps of:
    (i) collecting information from the plurality of traders regarding the degrees of satisfaction of the plurality of traders to take either position in the plurality of different securities; and
    (ii) selecting from the information collected in step b)(i) the input regarding the degrees of satisfaction of the plurality of traders to take a position opposite to the first party in each of the plurality of different securities.

12. The method according to claim 1, wherein the step e) of identifying further comprises the steps of:
    (i) determining an absolute maximum value of the composite function;
    (ii) defining a region about the absolute maximum value of the composite function; and
    (iii) determining a trading price, a trading volume and a trading party for each security of the plurality of different securities so that a resulting value of the composite function lies within the region defined in step e)(ii).

13. The method according to claim 12, wherein the step e)(iii) of determining further comprises the step of selecting the trading price, the trading volume and the trading party using predetermined criteria.

14. The method according to claim 12, wherein the predetermined criteria includes a nearest practical trading volume.

15. The method according to claim 12, wherein the predetermined criteria includes a nearest practical trading price.

16. The method according to claim 12, wherein the predetermined criteria includes a maximization within said region of a trading price in each of the plurality of different securities in favor of the trading parties.

17. The method according to claim 1, further comprising the step of:
    f) defining the composite function by $$MS(P_1, \ldots, P_N) = S_L(c) \cdot S_C(P_1, \ldots, P_N)$$

where c is a function of $P_i$, $V_i$, i=1 to N, and $S_L(c)$ is the first function and $S_C(P_1, \ldots, P_N)$ is the joint function.

18. The method according to claim 17, further comprising the step of:
    g) determining the maximum mutual satisfaction from an intersection between support regions of $S_L(c)$ and $S_C(P_1, \ldots P_N)$.

19. The method according to claim 18, further comprising the step of:
    h) selecting any point in a particular region of price space over which $MS(P_1, \ldots, P_N)$ is unity to determine the trading price, trading parties and trading volume in which to execute the trade when unity satisfaction regions of $S_L(c)$ and $S_C(P_1, \ldots, P_N)$ intersect, and hence the mutual satisfaction $MS(P_1, \ldots, P_N)$ is unity over said particular region of price space.

20. The method according to claim 19, further comprising the step of:
    i) selecting the point by selecting a unique centroid point in a hyperplane section bounding a region of unity values of $MS(P_1, P_N)$, which hyperplane corresponds to a maximum value of c for which $S_L(c)$ has unity value, thereby yielding a most favorable price to each of the trading parties in the region of unity values of $MS(P_1, P_N)$.

21. A method for automatically determining a set of terms of an agreement between a first party and at least one other party, wherein the agreement includes a plurality of terms, comprising the steps of:
    a) mapping input from the first party regarding the plurality of terms in the agreement into a first function expressing a degree of satisfaction of the first party to agree to the plurality of terms over a range of values of a decision variable;
    b) collecting input in a central database from at least one other party regarding the degree of satisfaction of the at least one other party to enter into the agreement with the first party on individual ones of the plurality of terms;
    c) mapping the input into a second function expressing the degree of satisfaction of the at least one other party to agree to the plurality of terms as a function of the decision variable in each of the plurality of terms;
    d) determining a composite function of the first function and the second function, wherein the composite function represents a mutual degree of satisfaction between the first party and the at least one other party to agree to the plurality of terms; and
    e) determining a set of terms and a value for each of the decision variables for the agreement from a maximum of the composite function.

22. The method according to claim 21, wherein the step b) of collecting further comprises:
    (i) collecting information from a plurality of other parties regarding the degrees of satisfaction of the plurality of other parties to enter into an agreement on individual ones of the plurality of terms; and (ii) selecting from the information collected in step b)(i) the input regarding the degrees of satisfaction of the at least one other party to enter into the agreement with the first party on the individual ones of each of the plurality of terms in the agreement.

23. The method according to claim 21, wherein the at least one party includes a plurality of parties, and the step e) of determining a set of terms further comprises the step of identifying a set of parties that agree to the set of terms and values for the decision variables.

24. The method according to claim 21, further comprising the step of:

f) executing automatically an agreement according to the set of terms and decision variables determined in step e).

25. The method according to claim 24, wherein the step b) of collecting further comprises the steps of:

(i) collecting information from a plurality of other parties regarding the degrees of satisfaction of the plurality of other parties to enter into an agreement on the individual ones of the plurality of terms; and (ii) selecting from the information collected in step b)(i) the input regarding the degrees of satisfaction of the at least one other party to enter into the agreement with the first party on the individual ones of each of the plurality of terms in the agreement.

26. The method according to claim 21, wherein the step e) of determining further comprises the steps of:

(i) determining an absolute maximum value of the composite function;

(ii) defining a region about the absolute maximum value of the composite function; and (iii) determining a set of values for each of the decision variables yielding a value of the composite function that lies within the region defined in step e)(ii).

27. The method according to claim 26, wherein the step e)(iii) of determining further comprises the step of selecting the set of values for each of the decision variables using predetermined criteria.

28. The method according to claim 26, wherein the predetermined criteria includes a nearest practical decision variable.

29. The method according to claim 26, wherein the predetermined criteria includes within said region maximizing the decision variable in favor of the at least one other party.

30. A method for automatically negotiating an agreement between a first party and a plurality of other parties, wherein the agreement includes a plurality of terms and the identity of the plurality of other parties is not known to the first party or to each other but the parties have expressed a willingness to enter into a binding agreement regarding the plurality of terms, comprising the steps of:

a) inputting to a computer a first function expressing a degree of willingness of the first party to agree to the plurality of terms over a range of values of a decision variable;

b) collecting input from the plurality of other parties including a plurality of second functions expressing a degree of preference by the plurality of other parties to agree to individual ones of each of the plurality of terms as a function of the decision variable in each of the terms;

c) determining a joint function of the plurality of second functions as a function of the decision variable in each of the terms;

d) determining a composite function of the first function and the joint function, wherein the composite function represents the mutual degree of preference between the first party and the plurality of other parties to agree to the plurality of terms;

e) determining a maximum of the composite function;

f) obtaining a set of terms and decision points for the agreement represented by a point within a predetermined range about the maximum of the composite function; and g) executing an agreement which includes the terms obtained in step f).

31. A method for collectively trading a plurality of different items, comprising the steps of:

a) collecting data from a first party desirous of simultaneously trading the plurality of different items that indicates a volume for each item, a range of costs for the collective trade, and a first factor indicative of the first party's willingness to trade the plurality of different items at the specified volumes for each cost within the range of costs, while also collecting data from other parties that indicates for a given item, a particular price/volume combination and a second factor indicative of the party's willingness to trade at that particular price/volume combination;

b) maximizing a mutual satisfaction for the first party and the other parties, wherein the maximum mutual satisfaction solution defines a trade in each of the plurality of different items between the first party and a subset of the other parties; and c) executing automatically a trade defined in step b).

32. The method according to claim 31, further comprising the step of maintaining secret the identities of the first party and the other parties, unless a trade is executed, at which time only the parties involved in the trade are disclosed.

33. The method according to claim 31, further comprising the step of maintaining secret the first factor and the second factors even after the trade is executed.

34. The method according to claim 31, wherein the plurality of different items comprises a plurality of different securities.

35. The method according to claim 31, wherein the plurality of different items comprises a plurality of different non-securities.

36. The method according to claim 31, wherein the plurality of different items comprises a plurality of different goods.

37. The method according to claim 31, wherein the plurality of different items comprises a plurality of different services.

38. The method according to claim 31, wherein the first party defines the collective trade by specifying a volume of each item to be traded, and a degree of willingness to trade for each cost within the desired range of costs.

39. A method for performing simultaneous trading of a plurality of securities, comprising the steps of:

a) mapping data from a first party regarding a simultaneous trade of a plurality of securities as a group into a first function expressing degrees of satisfaction of the first party to trade the plurality of securities simultaneously as a group over a desired range of costs;

b) collecting in a central database input from a plurality of traders regarding a degree of satisfaction of each of the plurality of traders to take a position opposite to the first party in at least one of the plurality of securities as a function of price;

c) determining from the input of the plurality of traders a joint function expressing a joint degree of satisfaction by one or more second parties among the plurality of traders to take an opposite position in all of the plurality of securities as a function of price in each of the plurality of securities by
   (i) constructing a sell contra satisfaction function for each security to be purchased by determining a minimum price for which the volume can be purchased, along with a corresponding volume-weighted satisfaction at that price;
   (ii) incrementing the price upward from the minimum price;
   (iii) calculating the volume-weighted satisfaction at each price increment until a volume-weighted satisfaction value of unity is obtained;
   (iv) constructing a buy contra satisfaction function for each security to be sold by determining a maximum price for which the volume can be sold, along with a corresponding volume-weighted satisfaction at that price;
   (vi) incrementing the price downward from the maximum price; and
   (vii) calculating the volume-weighted satisfaction at each price increment until a volume-weighted satisfaction value of unity is obtained,
      wherein the joint function is a function of each of the buy and sell contra satisfaction functions;
d) determining a composite function of the first function and the joint function, wherein the composite function represents a mutual degree of satisfaction to execute a trade of the plurality of securities between the first party and the one or more second parties; and
e) identifying for each of the plurality of securities a trading price, a trading volume and a trading party among the one or more second parties that maximizes the composite function.

40. The method according to claim 39, wherein the joint function is a product of the buy and sell contra side satisfaction functions.

41. The method according to claim 39, wherein the buy and sell contra side satisfaction functions include limit orders.

42. A system for trading a collection of different assets or liabilities simultaneously, comprising:
   a) a plurality of terminals via which a first party desirous of trading the collection enters data regarding its degree of satisfaction in trading the collection and a plurality of second parties enter data regarding their degree of satisfaction in trading components of the collection; and
   b) a controller executing a trade of the collection of different assets or liabilities simultaneously in accordance with a maximization of a mutual satisfaction of the first and second parties.

43. A method for trading a collection of different assets or liabilities that includes the steps of executing a simultaneous trade of the collection of different assets or liabilities in accordance with a maximization of the mutual satisfaction of a party desirous of trading the collection and a plurality of other parties desirous of taking a contra position in individual components of the collection.

44. A system for automatically trading a plurality of different securities simultaneously comprising:
   a) a first workstation at which a linked trader can input a satisfaction density profile that defines its degree of satisfaction to trade different securities simultaneously based on the overall cost of the transaction;
   b) a plurality of other workstations at which individual securities traders can enter a satisfaction density profile that indicates their degree of satisfaction to trade particular securities as a function of price/volume; and
   c) a central control engine determining:
      (1) a satisfaction density function for each of the individual securities based on the input of the traders,
      (2) determining a joint satisfaction function for all of the different securities from the individual satisfaction density functions,
      (3) determining a mutual satisfaction function from the joint satisfaction function and the satisfaction density profile entered by the linked trader, and
      (4) maximizing the mutual satisfaction function, which establishes a set of prices, volumes and parties for trading each of the individual securities, and
      (5) executing simultaneously a trade among the identified parties for the different securities at the established prices and volumes.

45. The system according to claim 44, wherein the plurality of other workstations include a plurality of personal computers.

46. The system according to claim 44, wherein the plurality of other workstations include a plurality of display terminals operated by the central control engine.

47. The system according to claim 44, wherein the plurality of other workstations include a high performance workstation.

48. The system according to claim 44, wherein the plurality of other workstations include a RISC based workstation.

49. The system according to claim 44, wherein the plurality of other workstations include a UNIX based workstation.

50. The system according to claim 44, wherein the central control engine includes a mainframe computer.

51. The system according to claim 44, further comprising a central database coupled to the plurality of other workstations, the first workstation and the central control engine, and storing input from each of the plurality of traders regarding a degree of satisfaction of each of the plurality of traders to take a position in a plurality of different securities as a function of price.

52. The system according to claim 51, further comprising an extraction routine operating under control of the central control engine and extracting from information stored in the database the degrees of satisfaction of the plurality of traders to take a position opposite to the first party in each of the different securities.

53. An apparatus for determining trading parties, trading prices and trading volumes for performing simultaneous trading of a plurality of different securities, comprising:
   a) a graphical user interface mapping data from a first party regarding a simultaneous trade of a plurality of different securities as a group into a first function expressing degrees of satisfaction of the first party to trade the plurality of different securities simultaneously as a group over a desired range of costs;
   b) a central database for collecting input from a plurality of traders regarding a degree of satisfaction of each of the plurality of traders to take a position opposite to the first party in at least one of the plurality of different securities as a function of price; and
   c) a processor determining from the input of the plurality of traders a joint function expressing a joint degree of satisfaction by one or more second parties among the plurality of traders to take an opposite position in all of the plurality of different securities as a function of price in each of the plurality of different securities, determining a composite function of the first function and the joint function, wherein the composite function represents a mutual degree of satisfaction to execute a trade of the plurality of different securities between the first party and the one or more second parties, and identifying for each of the plurality of different securities a trading price, a trading volume and a trading party among the one or more second parties that maximizes the composite function.

54. The apparatus according to claim 53, further comprising means for executing simultaneously with the first party and the trading parties a trade in the plurality of different securities at the trading prices and the trading volumes identified by the processor.

55. The apparatus according to claim 53, further comprising a routine running under control of the processor for extracting information from the database under control of the processor, wherein the database collects and stores information from the plurality of traders regarding the degrees of satisfaction of the plurality of traders to take either position in the plurality of different securities, and the extraction routine selects from the information collected by the database the input regarding the degrees of satisfaction of the plurality of traders to take a position opposite to the first party in each of the plurality of different securities.

56. A device for automatically determining a set of terms of an agreement between a first party and at least one other party, wherein the agreement includes a plurality of terms, comprising:

a) a user terminal for mapping input from the first party regarding the plurality of terms in the agreement into a first function expressing a degree of satisfaction of the first party to agree to the plurality of terms over a range of decision variables;

b) a plurality of terminals via which other parties enter input regarding a degree of satisfaction to enter into an agreement on individual ones of the plurality of terms;

c) a database collecting input from at least one other party entered via the plurality of terminals regarding the degree of satisfaction of the at least one other party to enter into the agreement with the first party on the plurality of terms; and d) a processor mapping the input from the database into a second function expressing the degree of satisfaction of the at least one other party to agree to the terms as a function of decision variables in each of the terms, determining a composite function of the first function and the second function, wherein the composite function represents a mutual degree of satisfaction between the first party and the at least one other party to agree to the plurality of terms, and determining a set of terms and a value for each of the decision variables for the agreement from a maximum of the composite function.

57. The device according to claim 56, further comprising:

e) means for executing automatically an agreement according to the set of terms determined by the processor.

58. The device according to claim 56, further comprising a routine for extracting information from the database under control of the processor, wherein the database collects information from a plurality of other parties regarding the degrees of satisfaction of the plurality of other parties to enter into an agreement about the plurality of terms, and the extraction routine selects from the information collected in the database the input regarding the degrees of satisfaction of the at least one other party to enter into the agreement with the first party in each of the plurality of terms in the agreement.

59. In a system for performing simultaneous trading of a plurality of different securities, a device for determining trading parties, trading prices and trading volumes for the simultaneous trading of the plurality of different securities, comprising:

a) means for mapping data from a first party regarding a simultaneous trade of a plurality of different securities as a group into a first function expressing degrees of satisfaction of the first party to trade the plurality of different securities simultaneously as a group over a desired range of costs;

b) means for collecting input from a plurality of traders regarding a degree of satisfaction of each of the plurality of traders to take a position opposite to the first party in at least one of the plurality of different securities as a function of price;

c) means for determining from the input of the plurality of traders a joint function expressing a joint degree of satisfaction by one or more second parties among the plurality of traders to take an opposite position in all of the plurality of different securities as a function of price in each of the plurality of different securities;

d) means for determining a composite function of the first function and the joint function, wherein the composite function represents a mutual degree of satisfaction to execute a trade of the plurality of different securities between the first party and the one or more second parties; and e) means for identifying for each of the plurality of different securities a trading price, a trading volume and a trading party among the one or more second parties that maximizes the composite function.

60. The device according to claim 59, further comprising means for executing simultaneously with the first party and the trading parties a trade in the plurality of different securities at the trading prices and the trading volumes identified by the means for identifying.

61. The device according to claim 59, wherein the means for collecting further comprises:

means for collecting information from the plurality of traders regarding the degrees of satisfaction of the plurality of traders to take either position in the plurality of different securities; and means for selecting from the information collected by the means for collecting the input regarding the degrees of satisfaction of the plurality of traders to take a position opposite to the first party in each of the plurality of different securities.

62. The device according to claim 59, wherein the means for identifying further comprises:

means for determining an absolute maximum value of the composite function;

defining a region about the absolute maximum value of the composite function; and determining a trading price, a trading volume and a trading party for each security of the plurality of different securities so that a resulting value of the composite function lies within the defined region.

* * * * *